United States Patent
Branam et al.

(10) Patent No.: US 8,015,302 B2
(45) Date of Patent: Sep. 6, 2011

(54) METHODS, SYSTEMS, AND COMPUTER PROGRAM PRODUCTS FOR PROVIDING MEDIA CHANNEL SERVICES

(75) Inventors: Michael Branam, Lawrenceville, GA (US); Kevin Yu, Alpharetta, GA (US); Akbar Pirani, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 828 days.

(21) Appl. No.: 11/948,679

(22) Filed: Nov. 30, 2007

(65) Prior Publication Data

US 2009/0144786 A1 Jun. 4, 2009

(51) Int. Cl.
G06F 15/16 (2006.01)
G06F 15/173 (2006.01)
H04N 7/173 (2006.01)
(52) U.S. Cl. ........ 709/229; 725/109; 709/219; 709/226
(58) Field of Classification Search ................ None
See application file for complete search history.

(56) References Cited

U.S. PATENT DOCUMENTS

| | | | |
|---|---|---|---|
| 7,330,875 B1 * | 2/2008 | Parasnis et al. | 709/204 |
| 7,617,272 B2 * | 11/2009 | Bulson et al. | 709/203 |
| 7,711,838 B1 * | 5/2010 | Boulter et al. | 709/231 |
| 2006/0288111 A1 * | 12/2006 | Katinsky et al. | 709/228 |

* cited by examiner

*Primary Examiner* — John B. Walsh
(74) *Attorney, Agent, or Firm* — Cantor Colburn LLP

(57) ABSTRACT

Methods, systems, and computer program products for providing media channel services are disclosed. A method includes provisioning an Internet-Protocol (IP)-enabled media channel in response to a request to create a media channel account, which includes creating an account record for the media channel account, assigning a media device identifier to the account record, assigning a network address to the IP-based media channel, and storing the network address in the account record. The method also includes populating a storage system with editable and non-editable content. The editable content is received and controlled by a user of the media channel account via a media device, and the non-editable content is controlled by a network media services application. The method further includes creating and presenting a media channel page that includes the editable and non-editable content in response to a request by the user to initiate a session for the channel.

20 Claims, 23 Drawing Sheets

METHODS, SYSTEMS, AND COMPUTER PROGRAM PRODUCTS FOR PROVIDING MEDIA CHANNEL SERVICES

BACKGROUND

Exemplary embodiments relate generally to media channel services, and more particularly, to methods, systems, and computer program products for providing Internet Protocol-based media channel services.

Internet Protocol-enabled communications have become increasingly popular due to advances in technology and consumer demand. One advantage of IP-enabled communications is the large amount of communication bandwidth available, which lends itself to a wide variety of communications activities. Many types of media channels (e.g., television, radio, Internet) provide consumers with unlimited, and oftentimes, competing viewing/listening choices. Some existing systems, e.g., broadcast television, have limited bandwidth capabilities rendering them less attractive to many consumers, as compared, e.g., to Internet-based communications.

What is needed, therefore, is a way to provide media channel services to consumers that offer the advantages associated with IP-based technologies.

BRIEF SUMMARY

Exemplary embodiments include methods for providing media channel services. A method includes provisioning an Internet-Protocol (IP)-enabled media channel in response to a request to create a media channel account. The provisioning includes creating an account record for the media channel account, assigning a media device identifier to the account record, assigning a network address to the IP-based media channel account, and storing the network address in the account record. The method also includes populating a storage system with editable content and non-editable content. The editable content is received and controlled by a user of the media channel account via a media device, and the non-editable content is controlled by a network media services application in communication with the storage system. The method further includes creating and presenting a media channel web page that includes the editable and non-editable content from the storage system in response to a request by the user to initiate a session for the IP-enabled media channel.

Additional exemplary embodiments include systems for providing media channel services. A system includes a computer processing device, and a network media services application executing on the computer processing device. The network media services application implements a method. The method includes provisioning an Internet-Protocol (IP)-enabled media channel in response to a request to create a media channel account. The provisioning includes creating an account record for the media channel account, assigning a media device identifier to the account record, assigning a network address to the IP-based media channel account, and storing the network address in the account record. The method also includes populating a storage system with editable content and non-editable content. The editable content is received and controlled by a user of the media channel account via a media device, and the non-editable content is controlled by a network media services application in communication with the storage system. The method further includes creating and presenting a media channel web page that includes the editable and non-editable content from the storage system in response to a request by the user to initiate a session for the IP-enabled media channel.

Further exemplary embodiments include computer program products for providing network media services. A computer program product includes instructions for causing a computer to implement a method. The method includes provisioning an Internet-Protocol (IP)-enabled media channel in response to a request to create a media channel account. The provisioning includes creating an account record for the media channel account, assigning a media device identifier to the account record, assigning a network address to the IP-based media channel account, and storing the network address in the account record. The method also includes populating a storage system with editable content and non-editable content. The editable content is received and controlled by a user of the media channel account via a media device, and the non-editable content is controlled by a network media services application in communication with the storage system. The method further includes creating and presenting a media channel web page that includes the editable and non-editable content from the storage system in response to a request by the user to initiate a session for the IP-enabled media channel.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments provide Internet Protocol (IP)-based media services. The IP-based media services include network-based media channel services, media channel management of live and pre-recorded content, media channel content-based notifications, and management of media channel access and restrictions. The IP-based media services also include management of targeted advertising, remote control management of a media channel recording device, and an interactive electronic programming guide manager. The media channel services are described in FIGS. 1-3.

The media channel management of live content is described further in FIGS. 1 and 4-6. The media channel management of pre-recorded content is described further in FIGS. 1, 4, and 7-10. The media channel content-based notifications are described further in FIGS. 1, 9, and 11-13. The management of media channel access is described further in FIGS. 1, 3, 14, and 15. The management of media channel restrictions is described further in FIGS. 1, 3, 16, and 17. The media channel advertisement directory is described further in FIGS. 1, 3, 18, and 19. The management of targeted advertising is described further in FIGS. 1, 3, 5, and 20. The remote control management of a media channel recording device is described further in FIGS. 1, 5, 21, and 22. The interactive electronic programming guide manager is described further in FIGS. 1 and 23.

Figure 1:
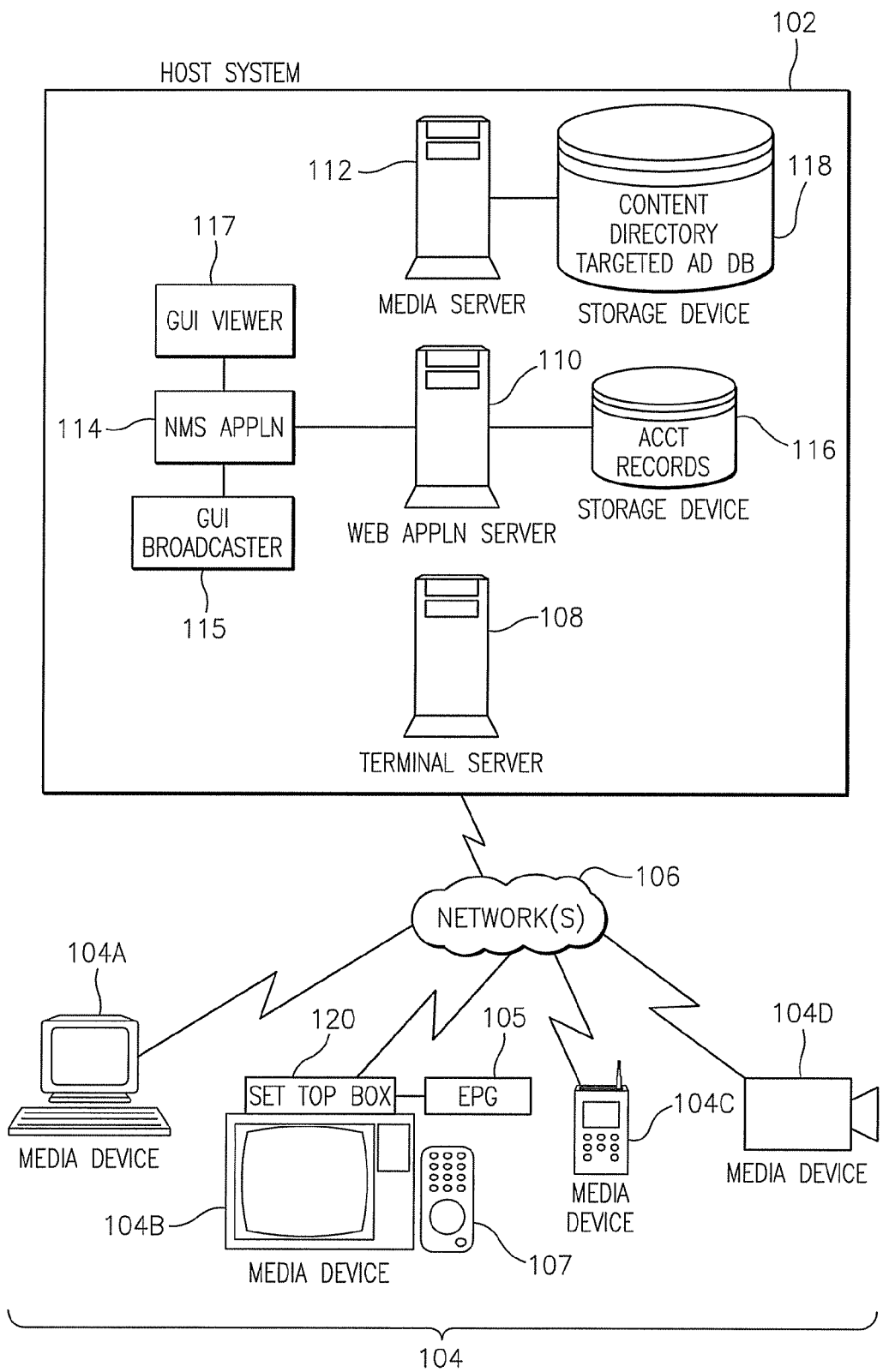
FIG. 1 is a block diagram depicting a system upon which media channel services may be implemented in accordance with exemplary embodiments.
Figure 2:
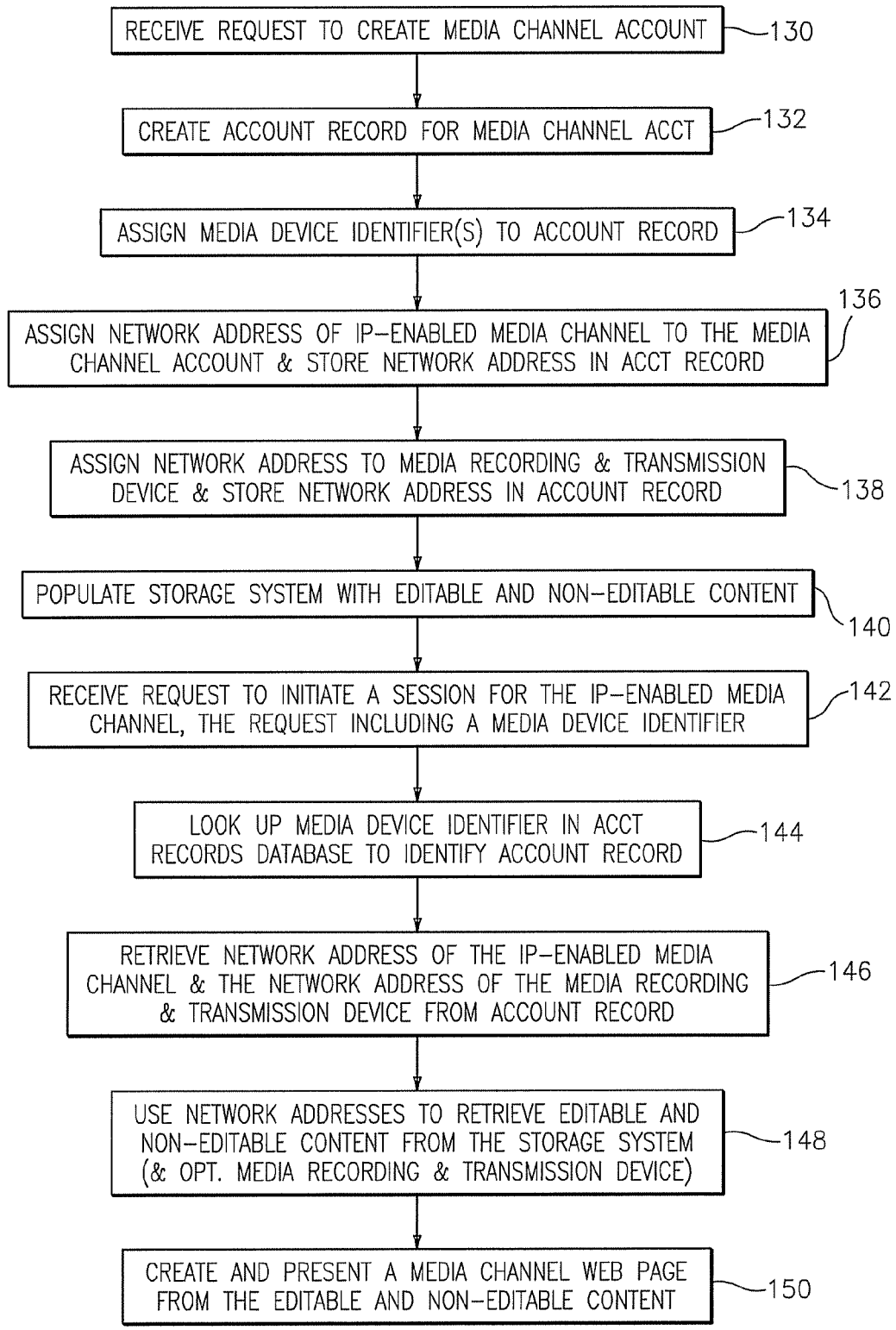
FIG. 2 is a flow diagram describing a process for implementing media channel services in accordance with exemplary embodiments.
Figure 3:
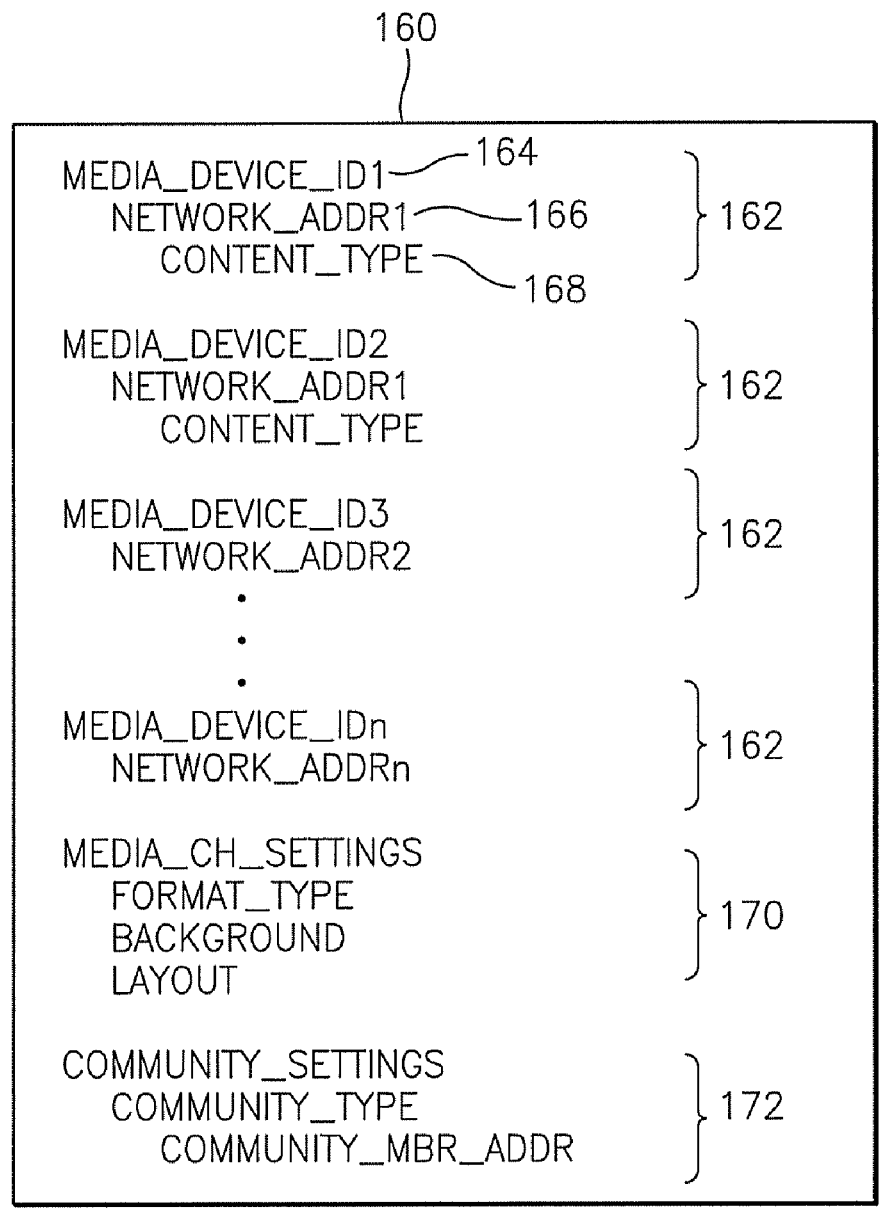
FIG. 3 is an account record created by the media channel services in accordance with exemplary embodiments.

Turning now to FIGS. 1-3, the media channel services will now be described in accordance with exemplary embodiments.

As used herein, the term "media device" refers to a device having a computer processor for managing digital content. The management features with respect to the digital content may include viewing, editing, recording, and transmission thereof. Media devices may be categorized as one or a combination of: a media channel viewing device, media channel broadcasting device, and media recording and transmission device. These categories are described further herein.

The term "media channel", as used herein, refers to an Internet Protocol (IP)-enabled communications medium that includes a dedicated network address for broadcasting editable and non-editable media content. The editable content includes formatting, layout, and design options for elements of a media channel web page, and user-selected members of a community authorized to view the media channel web page. The non-editable content associated with the network media application 114 includes content status data that distinguishes, e.g., live streaming digital media versus pre-recorded digital media; on-air versus off-air status of the live streaming digital media; and subject categories describing content and communities with which the media channel web page is shared. A media channel is provisioned by establishing a media channel account as described further herein.

The system of FIG. 1 includes a host system 102 in communication with media devices 104 via one or more networks 106. The host system 102 may be implemented using a high-speed processing device that is capable of handling high volume activities conducted via media devices 104, and other network entities. Host system 102 may be implemented by a network service provider, content service provider, or other enterprise.

Media devices 104 include, e.g., a general-purpose desktop or laptop system 104A that operates over one or more of networks 106 via an access technology such as, but not limited to, digital subscriber line (DSL) technology, cable modem technology, or dial-up technology. A media device 104B may be an Internet Protocol-enabled television (IPTV). The media device 104B may include a set-top box 120 through which the media device 104B communicates over networks 106. A user of the media device 104B may initiate at least a portion of the network media services through an input unit, such as a remote control device 107, which communicates with the media device 104B. The set-top box 120 may store an electronic programming guide (EPG) 105. A media device 104C may be a mobile telephone that operates over a wireless network (e.g., one of networks 106) using various wireless protocols. A media device 104D may be a media recording and transmission device. The media recording and transmission device may be implemented as a standalone video recording device having installed therein, a computer processor, memory, and communications components. Each of the media recording devices 104A-104D may include a media recording component, e.g., media device 104B may include a digital video recording feature.

The media devices 104 may receive Internet services from the provider enterprise of host system 102. The media devices (e.g., devices 104A-104D) may be in communication with the host system 102 via other network entities (e.g., routers, servers, base stations or cell towers, etc.) over one or more of the networks 106. For example, the system of FIG. 1 may include a router and modem communicatively coupled to the media device 104A, the set top box 120 communicatively coupled to the media device 104B, and a subscriber identity module (SIM) card and base station communicatively coupled to the media device 104C. The host system 102 receives requests from one or more media devices 104A-104D either to establish a media channel account or to initiate a session for an existing media channel account. A media channel account is established for a user of a media device requesting provisioning of a media channel. The media channel account identifies a network address of the media channel provisioned for the media device 104, as well as a media device identifier. This, as well as other information, is stored in an account record, which is maintained in a storage device accessible by the host system 102, such as a storage device 116. A sample account record 160 is shown in FIG. 3.

In one exemplary embodiment, media devices 104 are owned/operated by one or more individuals that share some relationship (e.g., members of a household). While only four media devices 104 are shown in FIG. 1, it will be understood that any number of such media devices may be used to form a community of communications devices. For example, a SIP telephone, dual-mode mobile telephone, personal digital assistant (PDA), or other type of media device may be included in the system of FIG. 1.

The host system 102 implements one or more applications for establishing and managing network-based media channels and providing related services. These one or more applications are collectively referred to herein as a network media services application 114. A media channel account may be created for a community of media devices (e.g., devices 104A-104D) as described herein. In addition, all or a portion of the media devices 104A-104D may be associated with a single user or a community of users (e.g., household members). One or more of the media devices 104A-104D may be co-located in a customer premises. In alternative exemplary embodiments, each of the media devices 104A-104D are independent of one another and do not share such associations. A community of media devices 104 may be defined by an account holder as one of: private, semi-private, and public. A private community refers to a small group of the media devices 104 that include at least one of the media devices 104. The small group of media devices 104 may be associated with at least one family member or friend. As shown in the account record 160 of FIG. 3, a community data structure, configured as COMMUNITY_SETTINGS 172, enables a user to configure a community, including a community type (e.g., private, semi-private, or public), as well as identifiers of the community members (COMMUNITY_MBR_ADDR). In addition, provisioning the IP-enabled media channel includes storing a network address 166 of each of the small group of media devices 104 (162) in the account record 160, and associating a descriptor (MEDIA_DEVICE_ID) 164 with each of the media devices 104 (162) in the small group.

A semi-private community refers to a group of media devices that are associated with a defined community, e.g., a religious organization, a school, a profit-based business enterprise, a non-profit based organization, a recreational organization, a neighborhood community, and a government agency, to name a few. Thus, only members of the semi-private community would have access to the media channel. A public community refers to a group of media devices 104 for which no viewing restrictions of the media channel are imposed.

The networks 106 may include circuit-switched and/or packet-switched technologies and devices, such as routers, switches, hubs, etc., for facilitating communications between media devices 104A-104D and the host system 102. The networks 106 may include wireline and/or wireless components utilizing, e.g., 802.11 standards for providing over-the-air transmissions of communications.

According to an exemplary embodiment, the host system 102 includes a media server 112. The media server 112 may be implemented at a video head end office (VHO), regional video services office (VSO) or other source of content that distributes programming, news, gaming, etc., on a local, national, or international basis. While only one media server 112 is shown for ease of illustration, it will be understood that the media server 112 may be one of many media servers 112 in communication with the host system 102 of FIG. 1. These media servers may provide a variety of content over an IP-based network. In an exemplary embodiment, the content includes user-configurable content transmitted over a dedicated media channel that is assigned to a user. The content provided by the media server 112 may include, e.g., live streaming digital media, pre-recorded or video-on-demand (VOD) media, static images, text, calendars, etc. Other types of content may be provided by the media server 112, including premium channels, broadcast programming, and Internet-based matter. However, the latter type of content is transmitted via a different channel than the media channel described herein.

Figure 4:
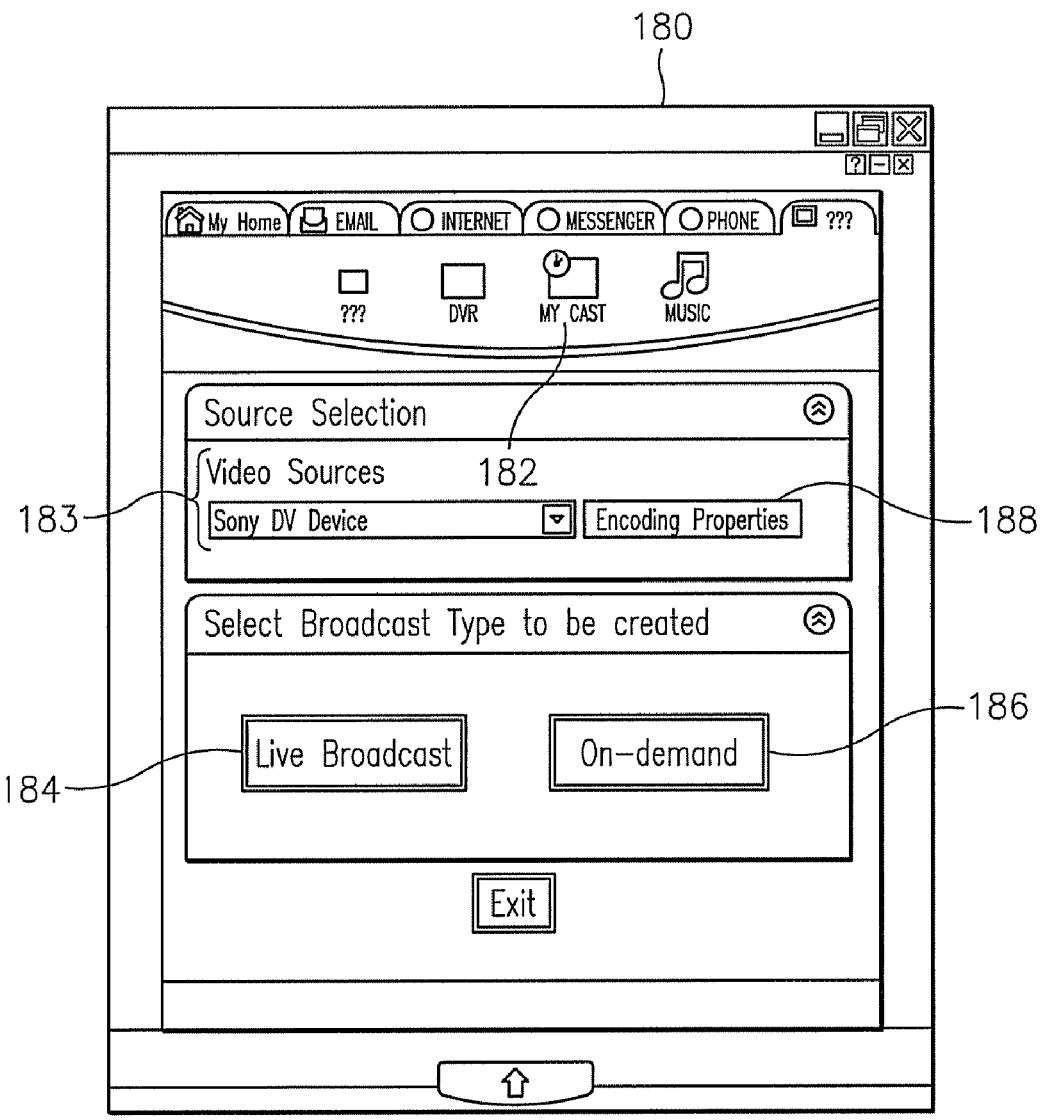
FIG. 4 illustrates a user interface screen including menu options for managing live and pre-recorded content for a media channel in accordance with exemplary embodiments.

In an exemplary embodiment, the host system 102 includes a web application server 110 that executes the network media services application 114 for use in facilitating the media channel services described herein. The network media services application 114 executes on the web application server 110 and is in communication with the storage system. The network media services application 114 may include a graphical user interface 115 for receiving a portion of the editable content from a media device 104 account holder and for executing user-configured settings with respect to a media channel web page. A sample user interface screen 180 is shown in FIG. 4.

The editable content is stored in the storage system (e.g., memory of the one of media devices 104A-104C, the memory of the media recording and transmission device 104D, storage device 116, and/or a storage device 118). The storage device 116 is in communication with the web application server 110, and the storage device 118 is in communication with the media server 112. The editable content stored in storage device 116 may include, e.g., user-configured settings, such as formatting, design, and layout options, as well as defined communities for viewing the media channel. The editable content stored in storage device 118 may include, e.g., content selections with respect to content files that are published on the media channel web page. Examples of these content selections include static images, audio files, pre-recorded content, live streaming digital media, text, etc.

According to exemplary embodiments, the web application server 110 receives the media device identifier (e.g., one of MEDIA_DEVICE_ID#s 164 of account record 160) from the media device 104 in response to the request to create a media channel account or initiate a session. The media device identifier may be transmitted to the web application server 110 via a terminal server 108 in communication with the media device 104 and the web application server 110. In this embodiment, the terminal server 108 transmits the media device identifier to the web application server 110. The network media services application 114 searches account records in storage device 116 for the requester's account record.

In addition, users of the media devices 104A-104D, who have created a media channel account, may establish personalized electronic programming guides for customizing the content provided by content sources (e.g., the media server 112). In addition, a separate identity for each IPTV-enabled communications device (e.g., communications device 104B) associated with the account may be established for further personalizing the content received by users in the account. These options are described further herein.

While the network media services application 114 is described as being executed on the web application server 110 over networks 106, it will be understood that the exemplary embodiments are not so limited. For example, at least a portion of the features of the network media services application 114 may be implemented by one or more of the media devices 104A-104D, e.g., as an applet from the host system 102.

In exemplary embodiments, a media device 104 is provisioned for the network media services by associating a media device identifier of the media device 104 with a respective account record (e.g., account record 160). In accordance with exemplary embodiments, the account record 160 stores media channel account settings 170, a network address of the media channel and assigned user, and network addresses of pre-recorded and live media content. Turning now to FIG. 2, a process for establishing and utilizing an Internet Protocol (IP)-based media channel account via the network media services application 114 will now be described in exemplary embodiments.

At step 130, the network media services application 114 receives a request from one of media devices 104A-104D to create a media channel account. The network media services application 114 provisions an Internet-Protocol (IP)-enabled media channel by creating an account record, such as the account record 160, for the media channel account at step 132; assigning a media device identifier, such as the media device identifier 164, to the account record 160 at step 134, assigning a network address, such as the network address 166, to the IP-based media channel account; and storing the network address 166 in the account record at step 136. The web application server 110 receives the media device identifier 164 from the media device 104 in response to the request to create a media channel account or initiate a session. The media device identifier 164 may be transmitted to the web application server 110 via the terminal server 108 in communication with the media device 104 and the web application server 110. If the media device is 104B, e.g., the media device identifier 164 may include a globally unique identifier (GUID) provisioned for the media device 104B during manufacture, a MAC address, serial number, or other identifier.

The provisioning also includes assigning a network address, such as the network address 166, to a media recording and transmission device (e.g., 104D) (162), and storing the network address 166 in the account record 160 at step 138. The editable content may include content selections received with respect to multiple media recording and transmission devices (e.g., 104D) associated with the account record 160. The content selections may be editable by activating or deactivating a network address for a corresponding one of the media recording and transmission devices 104D. This feature is described further herein.

At step 140, the network media services application 114 populates the storage system with editable content and non-editable content. According to exemplary embodiments, the editable content is controlled by the user of the media channel device account via the media device (e.g., 104A-104D), and the non-editable content is controlled by the network media services application 114 in communication with the storage system. The editable content includes preferences, e.g., formatting, layout, and design options, such as the media channel account settings 170, for elements of the media channel web page, and user-selected members of a community configured using the COMMUNITY_SETTINGS 172 authorized to view the media channel web page, which are stored in the account record 160. According to exemplary embodiments, the non-editable content associated with the network media services application 114 includes content status data that distinguishes: live streaming digital media versus pre-recorded digital media; on-air versus off-air status of the live streaming digital media; and subject categories describing content and communities with which the media channel web page is shared. Further, in accordance with exemplary embodiments, the editable content associated with the media server 112 or other storage system element includes content selections with respect to at least one of: audio files; static images; live streaming digital media; pre-recorded digital media; and text.

At step 142, a request is received from the user to initiate a session for the IP-enabled media channel. The request includes the media device identifier (e.g., GUID) for the requesting media device (e.g., media device 104B). At step 144, the network media services application 114 looks up the media device identifier in the account records database in storage device 116 to identify the account record, such as the account record 160, associated with the media device identifier. At step 146, the network media services application 114 retrieves the network address of the IP-enabled media channel and the network address of the media recording and transmission device 104D from the account record 160. At step 148, the network media services application 114 uses the network addresses to retrieve editable and non-editable content from the storage system, as well as content from the media recording and transmission device 104D, if applicable. At step 150, the network media services application 114 creates and presents a media channel web page that includes the editable and non-editable content from the storage system. The media device 104 receives at least one of the live streaming digital media and pre-recorded digital media from the media server 112 via the web application server 110. The live streaming digital media and pre-recorded digital media are transmitted to the media device 104 formatted as a media channel web page.

As indicated above, the network media services application 114 provides a user interface, such as the interface 115, via a display screen of the media device 104 such that a user of the device 104 may be prompted to initiate a live broadcast session or a pre-recorded (i.e., video-on-demand) broadcast session. If implemented via the media device 104B, e.g., the options provided by the user interface 115 may be selected via input features and functions (e.g., up/down, left/right arrow keys, 'select' key, etc.) provided on the media device 104B, the display screen of the media device 104B, or on the remote control device 107 associated with the media device 104B.

As indicated above, the set top box 120 associated with the media device 104B may be configured to send a unique device identifier (e.g., GUID, MAC address, serial number, etc.) to the host system 102, which in turn, initiates the network media services application 114. In this embodiment, the network media services application 114 presents the user interface options on the media device 104 and associates results of the user's selections with the media device identifier in the account record.

Figure 5:
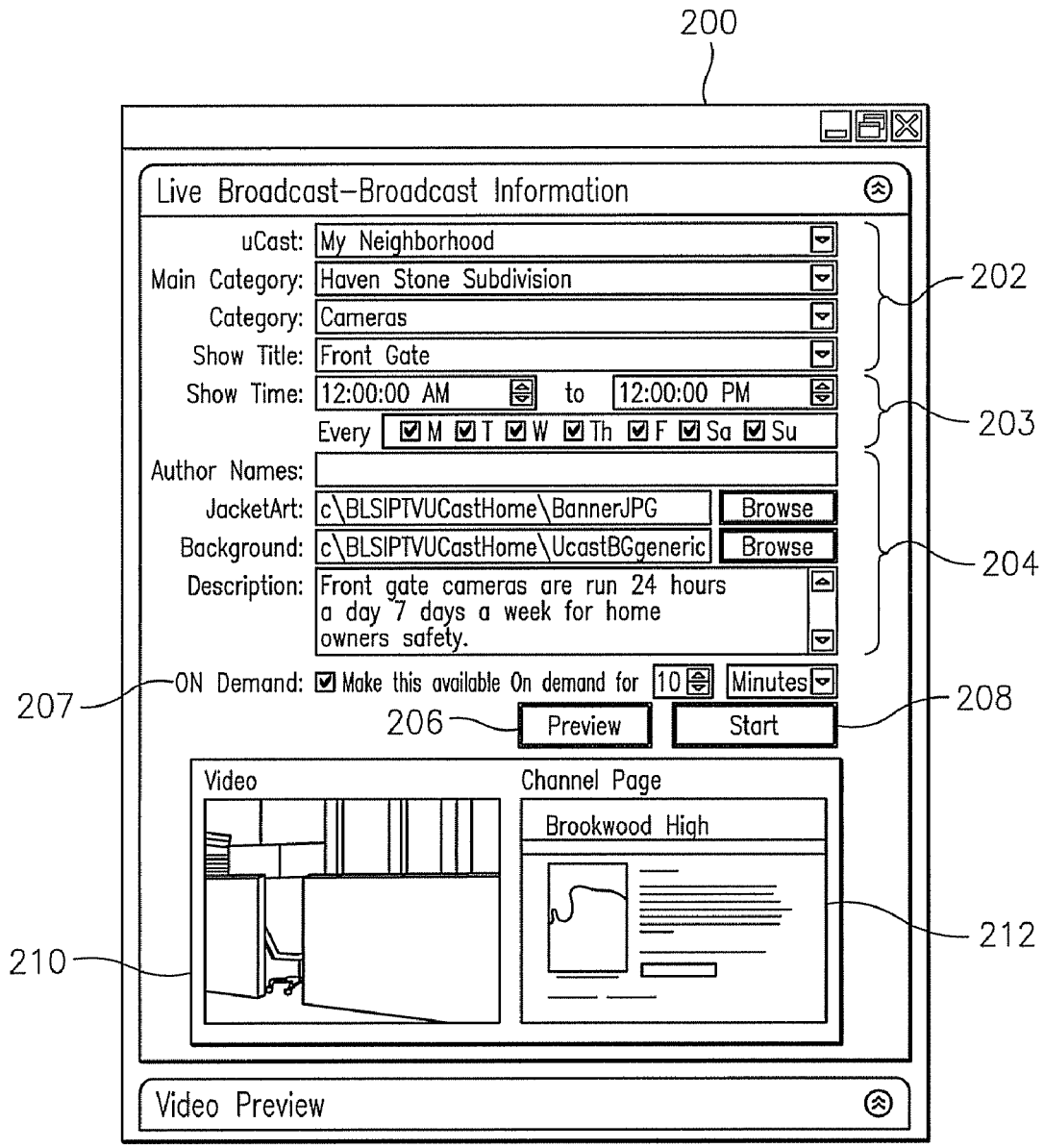
FIG. 5 illustrates a user interface screen for managing live content for a media channel in accordance with exemplary embodiments.
Figure 6:
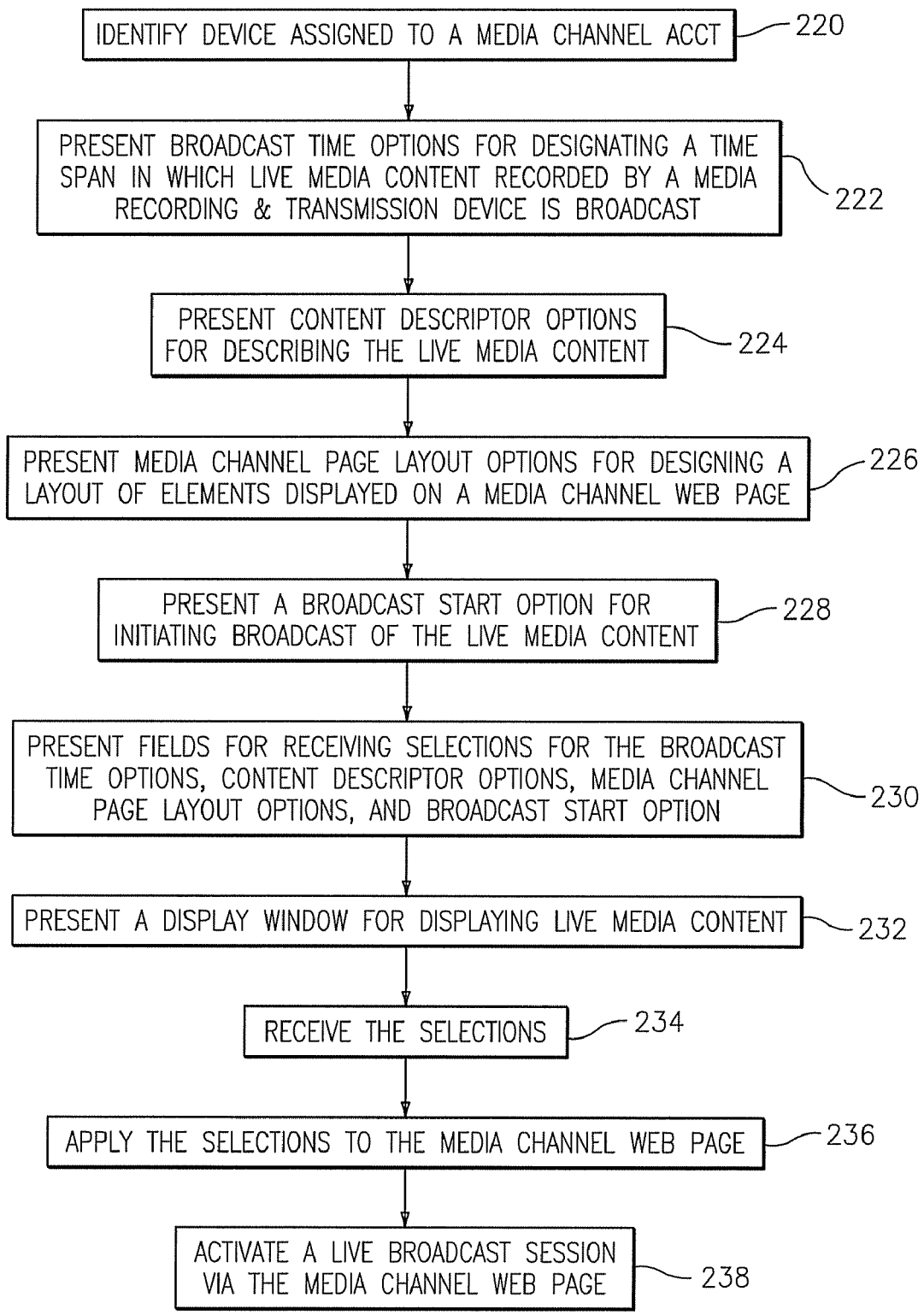
FIG. 6 is a flow diagram describing a process for managing live content of a media channel in accordance with exemplary embodiments.

Turning now to FIGS. 1 and 4-10, media channel management of live and pre-recorded broadcast sessions will now be described in accordance with exemplary embodiments. Management of the live broadcast session is described in FIGS. 4-6, and management of the pre-recorded broadcast session is described in FIGS. 4, and 7-10. FIG. 4 is a user interface screen 180 including menu options for initiating a live or pre-recorded broadcast session. FIG. 5 is a user interface screen 200 for managing a live broadcast session of a media channel. FIG. 6 is a flow diagram describing a process for implementing the media channel management features for a live media broadcast. A user of a media channel account may select a "MYCAST" option 182 on the user interface screen 180 of FIG. 4 for initiating the session.

At step 220, the network media services application 114 identifies the media device 104 from which the user initiated the session via the media device identifier as described in FIGS. 1-3. The user interface screen 180 enables the user to select which media recording and transmission device 104D to use for the live broadcast session. This feature is enabled via a "Video Source" option 183. This option 183 may be implemented using a drop down feature where multiple media recording and transmission devices 104D are associated with a media channel account. For example, the media recording and transmission devices 104D associated with a media channel account may be stored in the account record 160 of FIG. 3. Also included is an option for enabling customizable encoding options, such as optimization for image quality or optimization for bandwidth. This feature is enabled via an "Encoding Properties" option 188 in FIG. 4.

The user may select a "Live Broadcast" option 184 to initiate a live broadcast session. The network media services application 114 presents, via the user interface screen 200 of FIG. 5, various options, fields, and windows as will now be described. At step 222, broadcast time options 203 are presented for designating a time span in which live media content recorded by the media recording and transmission device will be broadcast. As shown in FIG. 5, the broadcast time options 203 include beginning and end time fields and days of week.

At step 224, content descriptor options 202 are presented for describing the live media content. As shown in FIG. 5, content descriptor options 202 may include the name of the media recording and transmission device used to execute the live media content, a subject category of the live media content, and a title of the live media content.

At step 226, media channel page layout options 204 are presented for designing a layout of elements displayed on a media channel web page that includes the live media content. As shown in FIG. 5, the media channel page layout options 204 may include author name, jacket art, background, and description of the live media content. In addition, a broadcast start option 208 for initiating broadcast of the live media content is presented at step 228. At step 230, fields for receiving selections for the broadcast time options, content descriptor options, media channel page layout options, and broadcast start option are presented alongside of the corresponding options 203, 202, 204, and 208.

At step 232, a display window 210 is presented for displaying the live media content. At step 234, the selections for options 202, 203, 204, and 208 are received by the network media services application 114 via the user interface screen 200 of FIG. 5. At step 236, the selections are applied to the media channel web page. A sample media channel web page 212 is shown in FIG. 5. At step 238, the network media services application 114 activates a live broadcast session via the media channel web page 212.

Other features may be provided via the user interface screen 200 of FIG. 5. For example, a user may desire to preview the live media content before activating the broadcast session. A preview option 206 may be provided via the user interface of the network media services application 114 as shown in the user interface screen 200. The preview option 206 also includes a feature for enabling the user to remotely adjust a camera angle of the media recording and transmission device 104D before, or during the live broadcast session. This remote control adjustment is described further herein.

Another feature of the user interface screen 200 allows the user to record a live broadcast session to a digital media recording device, via an on-demand recording option 207 shown on the user interface screen 200 of FIG. 5. According to exemplary embodiments, upon selecting this option 207, the network media services application 114 activates a recording feature of, e.g., a media device, such as the media device 104. The recorded broadcast session may then be used in the pre-recorded broadcast features described in FIGS. 4, and 7-10.

Figure 7:
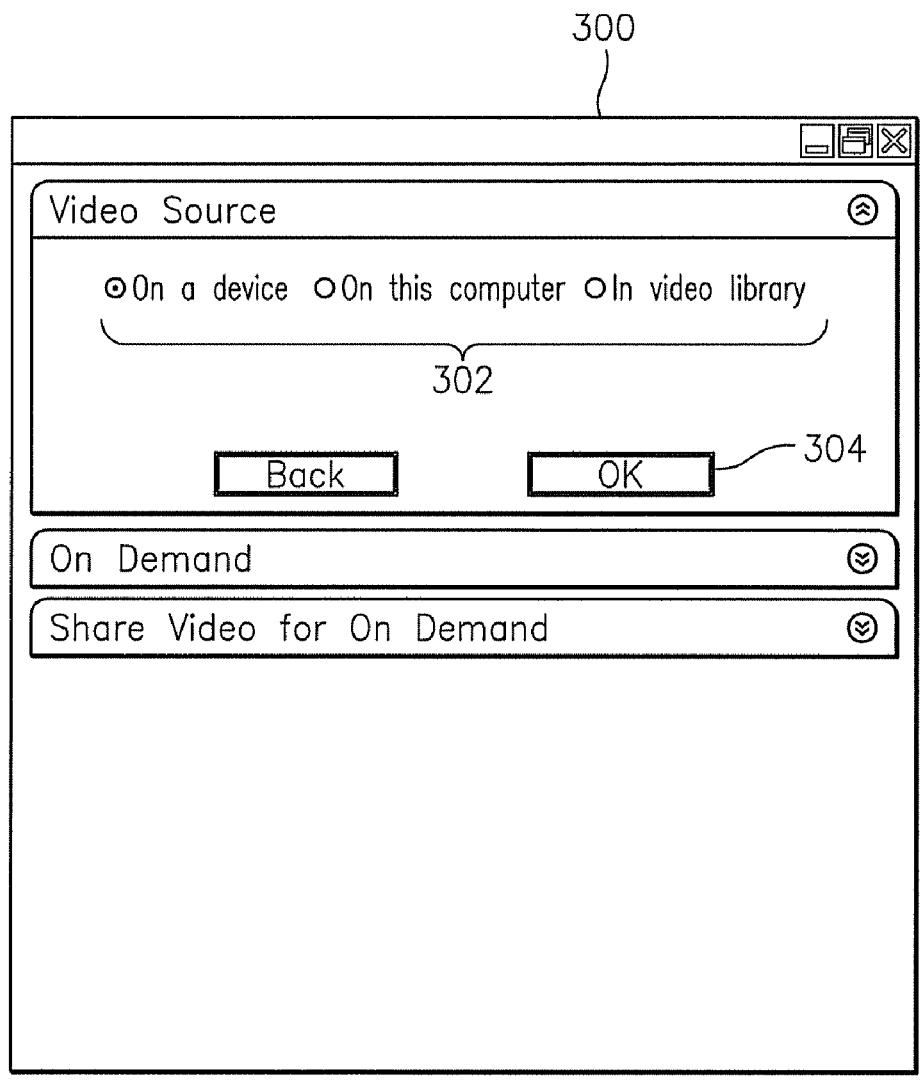
FIGS. 7-9 are user interface screens for managing pre-recorded content for a media channel in accordance with exemplary embodiments.
Figure 8:
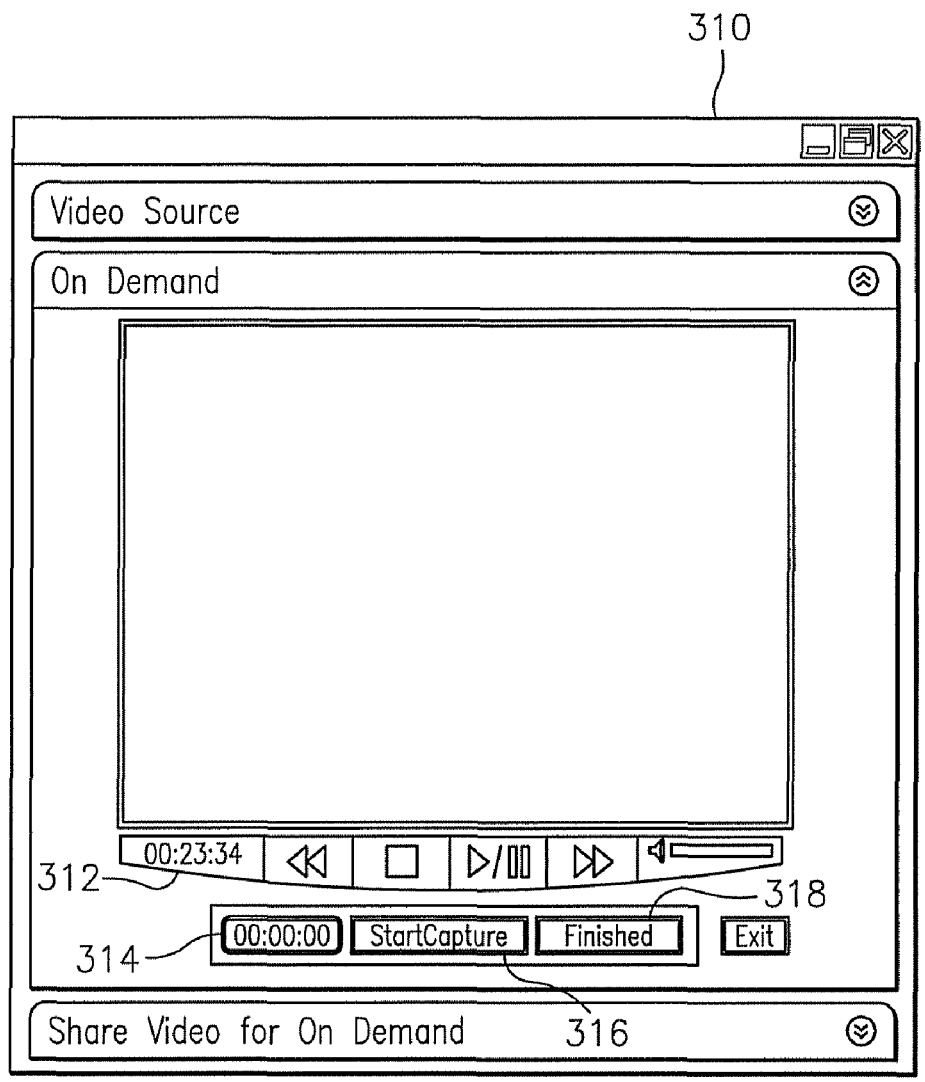
Figure 9:
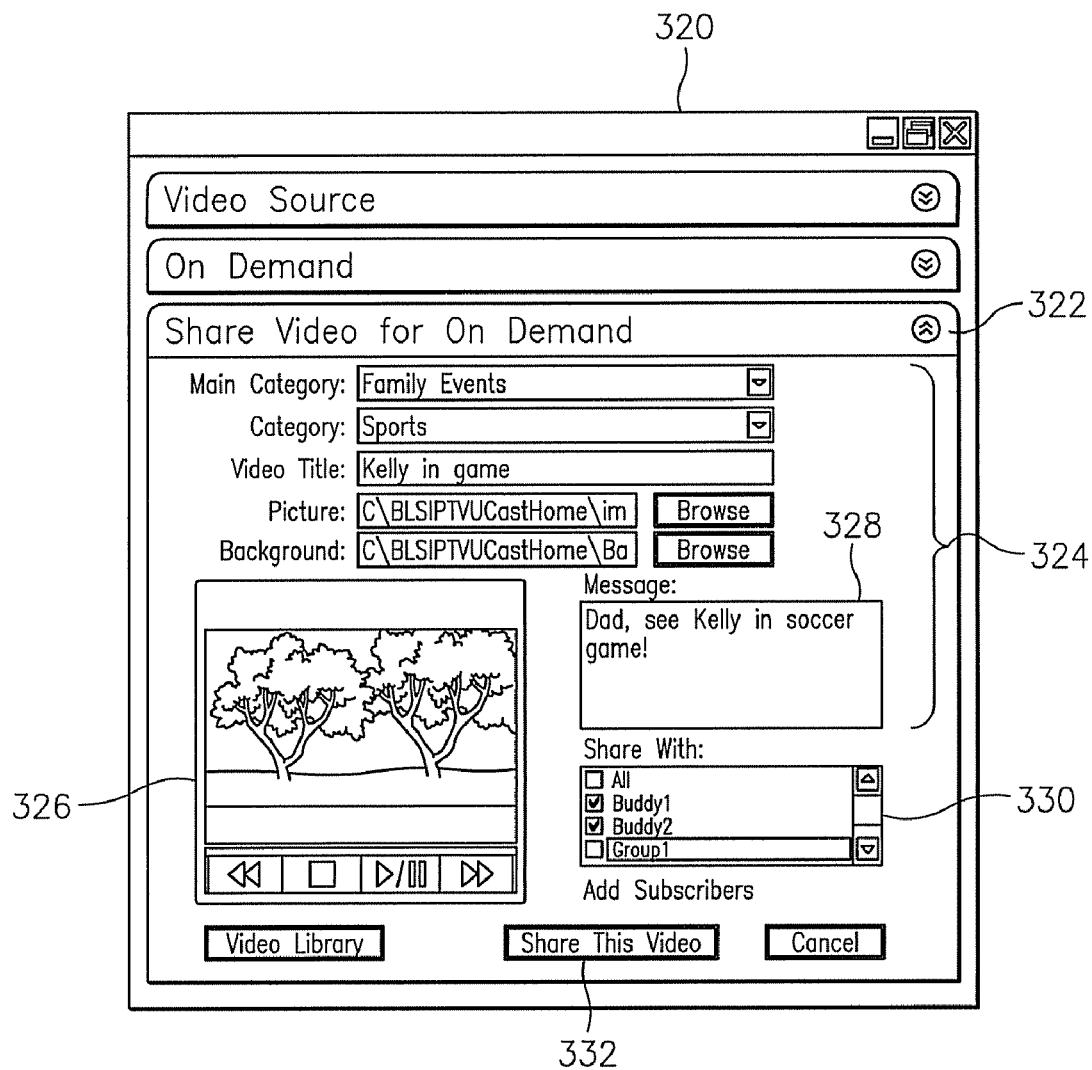
Figure 10:
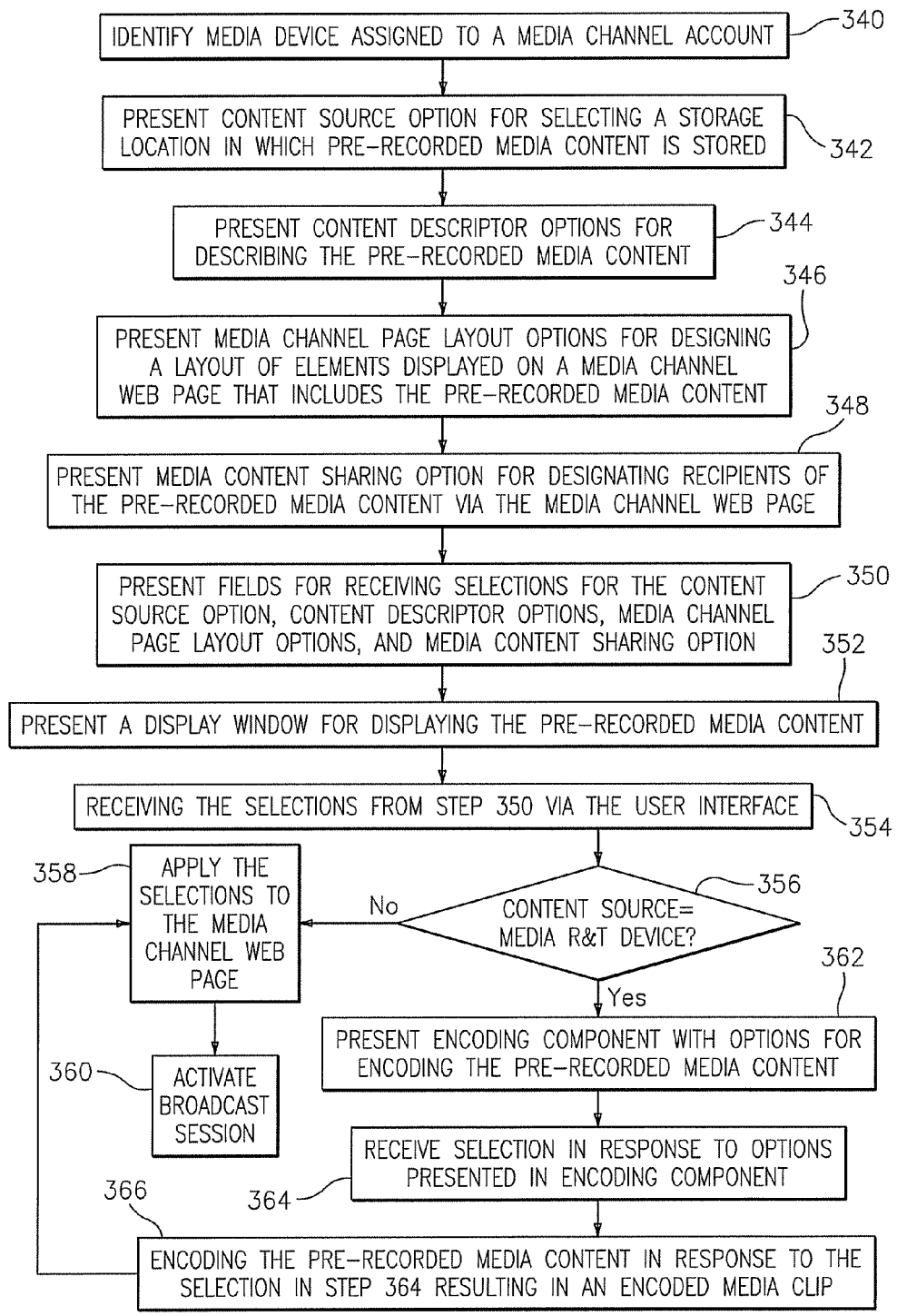
FIG. 10 is a flow diagram describing a process for managing pre-recorded content of a media channel in accordance with exemplary embodiments.

Turning now to FIGS. 4 and 7-10, media channel management of pre-recorded content will now be described in accordance with exemplary embodiments. FIG. 7 illustrates a user interface 300 for selecting sources of media content for broadcast. FIG. 8 is a user interface 310 used in providing media clip encoding. FIG. 9 is a user interface 320 for configuring a pre-recorded broadcast session that includes, e.g., the encoded media clip processed in FIG. 8. FIG. 10 is a flow diagram describing a process for managing the pre-recorded media content.

As indicated above, a media device, such as the media device 104, is identified by the network media services application 114 via a media device identifier received from the media device 104 in response to initiating a session (e.g., via selecting the "MYCAST" option 182 on the user interface screen 180 of FIG. 4). Similar to the live broadcast session features described above, the user interface screen 180 may enable the user to select which media recording and transmission device 104D to use for the pre-recorded broadcast session (i.e., via the "Video Source" option 183). Likewise, the "Encoding Properties" option 188 may also be used in implementing the pre-recorded media broadcast features.

In response to identifying the media device 104 in step 340, the user selects an "On Demand" option 186 to initiate a pre-recorded broadcast session. The network media services application 114 user interface presents, via the user interface screen 300 of FIG. 7, user interface screen 310 of FIG. 8, and user interface screen 320 of FIG. 9, various options for managing the broadcast features of the pre-recorded content. The user interface screen 300 of FIG. 7 presents content source options 302 for selecting a storage location in which the pre-recorded media content is stored, as well as an option 304 to accept, at step 342. The content source options 302 may include a media recording and transmission device 104D, which is disposed in a remote location from the media device (e.g., 104B), a local storage device (e.g., 104B), and a video library in communication with the network media services application 114 through which the user interface is presented (e.g., in storage device 118 of media server 112, as shown in FIG. 1).

At step 344, the user interface screen 320 of FIG. 9 presents content descriptor options for describing the pre-recorded media content as well as media channel page layout options for designing a layout of elements displayed on a media channel web page that includes the pre-recorded media content at step 346. These options in steps 344 and 346 are collectively referred to in FIG. 9 as options 324. The content descriptor options 324 may include a subject category of the pre-recorded media content, a title of the pre-recorded media content, and a message window 328 for entering text. The media channel page layout options 324 may include a background and pictures.

The user interface screen 320 of FIG. 9 also presents media content sharing options 322, 330, and 332 for designating recipients of the pre-recorded media content via the media channel web page at step 348. In addition, the user interface screens 300 and 320 include fields, respectively, for receiving selections for the content source options 302, content descriptor and media channel page layout options 324, and media content sharing options 322, 330, and 332 at step 350. The user interface, as depicted in user interface screen 320, also presents a display window 326 for displaying the pre-recorded media content at step 352. The network media services application 114 receives the selections via the user interface screens 300 and 320 at step 354.

The network media services application 114 determines whether the content source selected from options 302 is a media recording and transmission device 104D at step 356. If not, the selections from step 354 are applied to the media channel web page at step 358, and a broadcast session is activated via the media channel web page at step 360.

However, if the content source selected from options 302 is a media recording and transmission device 104D at step 356, then the user interface of the network media services application 114 presents a user interface screen, such as the screen 310, as depicted in FIG. 8, which displays an encoding component at step 362. The encoding component includes options for encoding the pre-recorded media content associated with the media recording and transmission device 104D. The options include a current time code element 312 that displays the time of a current frame of the pre-recorded media content, a final duration time code 314 that displays the duration of the encoded media content, a start capture option 316 for designating a time location of the pre-recorded media content in which to begin capture and encoding of the pre-recorded media content, and a finished capture option 318 for designating a time location of the pre-recorded media content in which to end capture and encoding of the pre-recorded media content. The selection of the 'finished' capture option 318 at step 364 causes the encoding of the selected portion of the pre-recorded media content. The process performed in step 364 results in an encoded media clip at step 366. The encoded media clip represents at least a portion of the pre-recorded media content. The process then returns to step 358.

Other options available via the user interface screen 310 include fast forward and rewind through the pre-recorded media content, and pausing or stopping the pre-recorded media content.

The user interface screen 310 of FIG. 8 also enables a user to preview the encoded video clip prior to activating the broadcast session. This feature may be implemented by selecting the play button on the user interface screen 310.

As indicated above, the network media services include a content-based notification feature. The notification feature enables a broadcaster (i.e., an individual designated as authorized to publish or broadcast media content via a particular media channel) to automatically distribute notifications of new or updated media content relating to a media channel web page.

Figure 11:
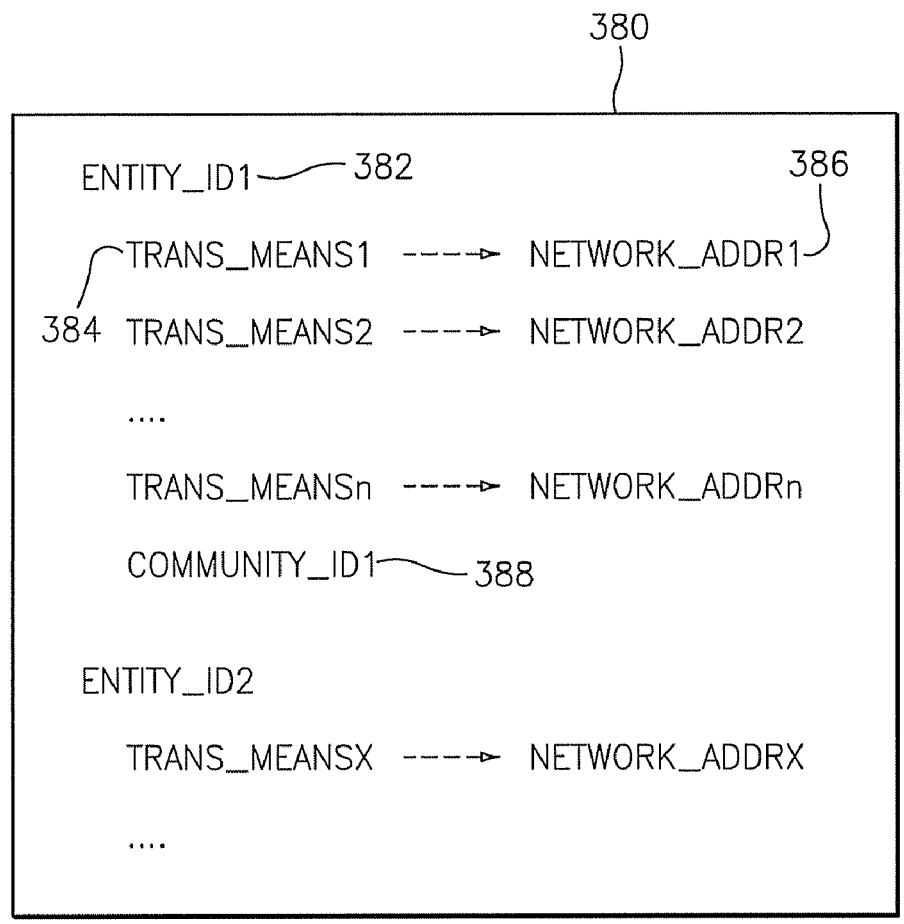
FIG. 11 is a notification record for providing media channel content-based notifications in accordance with exemplary embodiments.
Figure 12:
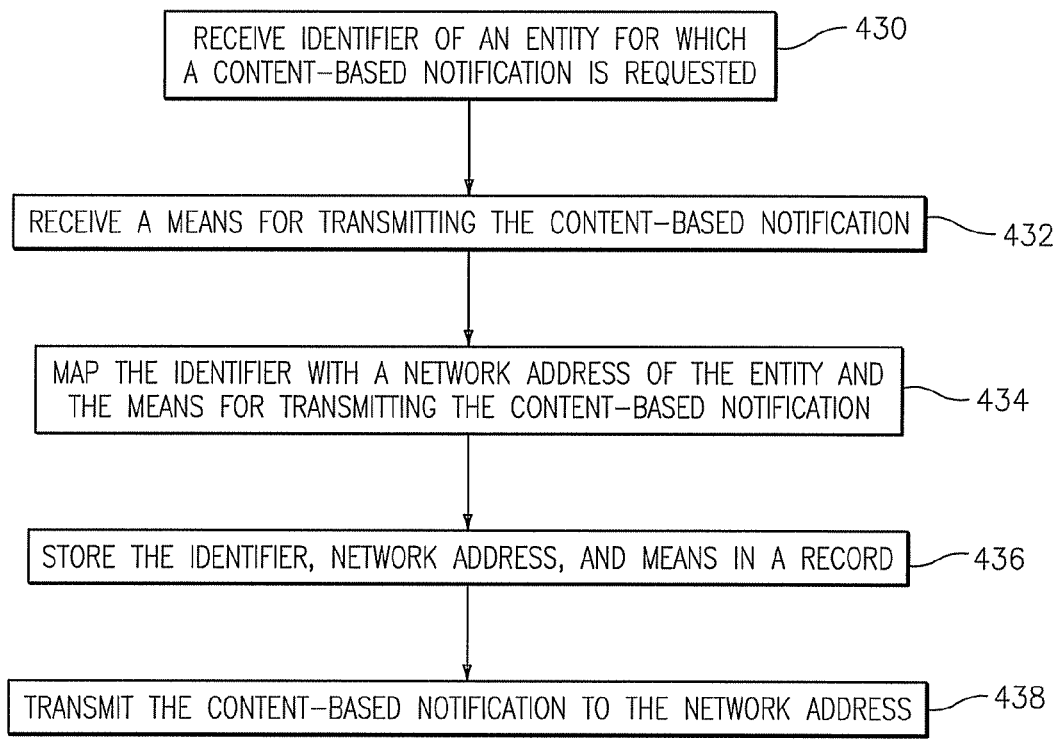
FIG. 12 is a flow diagram describing a process for implementing media channel content-based notifications in accordance with exemplary embodiments.
Figure 13:
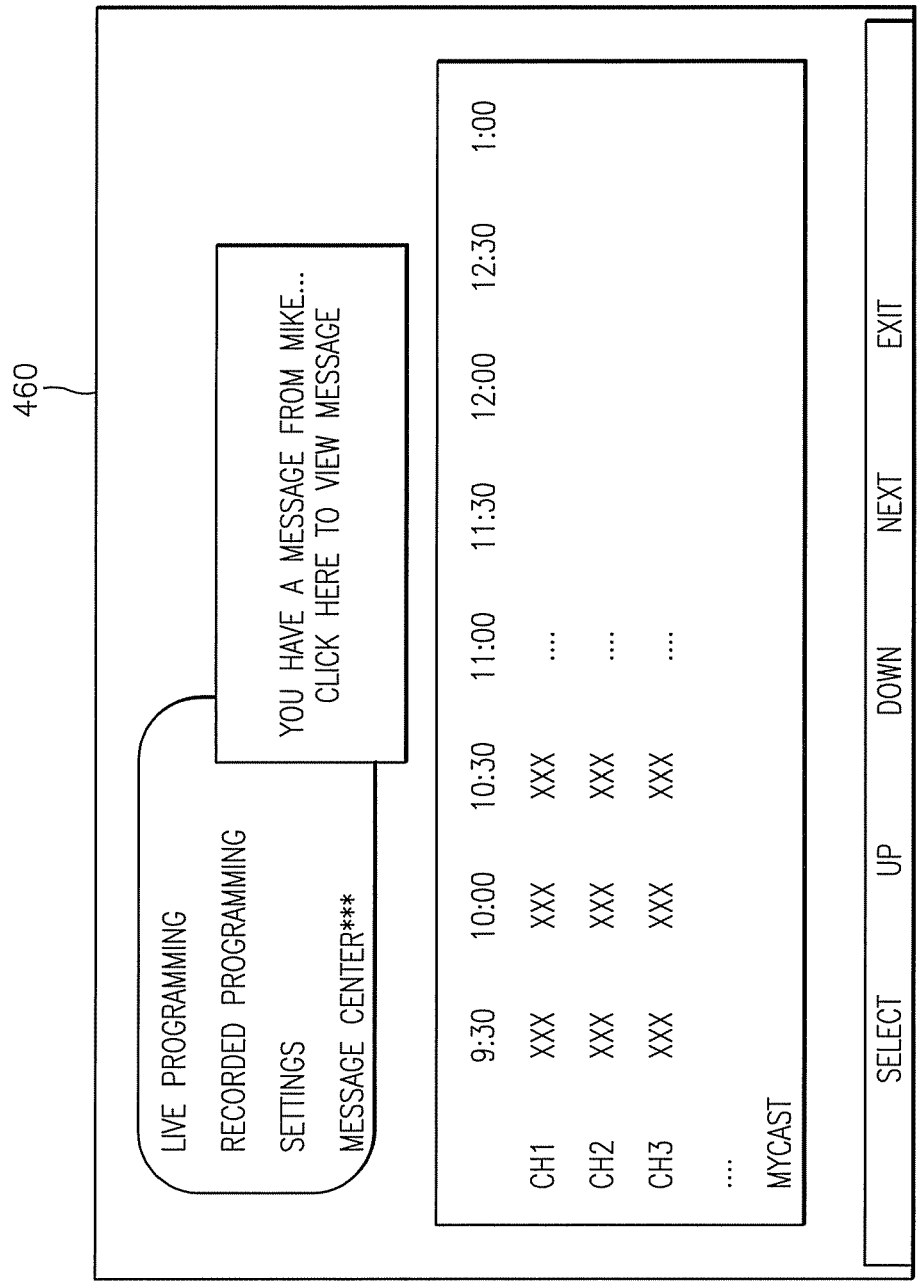
FIG. 13 is a user interface screen of an electronic programming guide depicting a sample notification relating to media channel content in accordance with exemplary embodiments.

Turning now to FIGS. 1, 9, and 11-13, the content-based notification features of the network media services will now be described in accordance with exemplary embodiments. FIG. 11 illustrates a notification record 380 that displays entities to which a content-based notification will be transmitted. FIG. 12 is a flow diagram describing a process for implementing the content-based notification features. FIG. 13 is a user interface 460 illustrating a content-based notification configured for an electronic programming guide (EPG). The content-based notification features may be implemented via a user interface of the network media services application 114, including, e.g., the window 330 illustrated in the user interface screen 320 of FIG. 9. A sample notification record, such as the notification record 380, is shown in FIG. 11.

At step 430, network media services application 114 receives an identifier of an entity for which the content-based notification is requested. As indicated above, the content-based notification identifies new or updated media content presented via a media channel. At step 432, the network media services application 114 receives a means for transmitting the content-based notification. According to exemplary embodiments, the means for transmission includes a destination including, e.g., an email account, a voicemail account, an instant messaging account, media channel web page of the media channel, electronic programming guide, and pager.

At step 434, the network media services application 114 maps the identifier with a network address for the entity and the means for transmitting the content-based notification. The network media services application 114 may provide a listing of identifiers for transmitting the content-based notification by retrieving the account record (e.g., record 160 of FIG. 3) or notification record 380 created from a notification user interface of the network media services application 114, and presenting the listing via the notification user interface for the media channel. In addition to presenting the listing of identifiers, the network media services application 114 may also provide a listing of transmission means configured for the selected identifier via, e.g., the notification record 380 created by the notification user interface of the network media services application 114. The entity identifier, network address, and means for transmission may be stored in the notification record 380 at step 436. At step 438, the network media services application 114 transmits the content-based notification to the network address. As shown in FIG. 11, the entity identifier is illustrated as an ENTITY_IDn 382, the transmission means is illustrated as a TRANS_MEANSn 384, the network address is illustrated as a NETWORK_ADDR1 386, and the community identifier is illustrated as a COMMUNITY_ID 388.

As indicated above, the network media services application 114 may store the identifier and the network address in the notification record 380 or a community data structure of the account record (account record 160 of FIG. 3). The community data structure 172 includes an element COMMUNITY_TYPE for enabling this feature. In addition, the network address for a community member may be enabled via the COMMUNITY_MBR_ADDR element of the community data structure 172. The community may be defined for each of a private, semi-private, and public community. As described above in FIGS. 1-3, the private community may comprise a small group of media devices that includes at least one media device, which corresponds to the entity. The small group of media devices may be associated with at least one family member or friend. In addition, the semi-private community may comprise a group of media devices that are associated with a defined community (e.g., religious organization, school, profit-based business enterprise, non-profit based organization, recreational organization, neighborhood community, and government agency). The public community may include a group of media devices for which no viewing restrictions are imposed.

Figure 14:
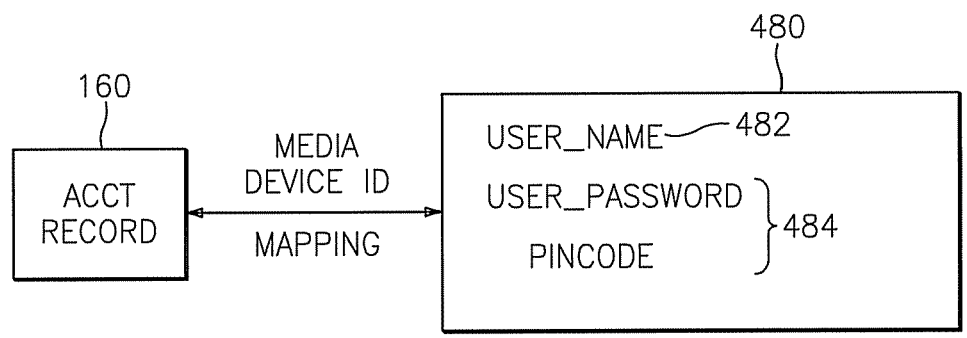
FIG. 14 is an authentication record mapped to an account record used managing access to a media channel in accordance with exemplary embodiments.
Figure 15:
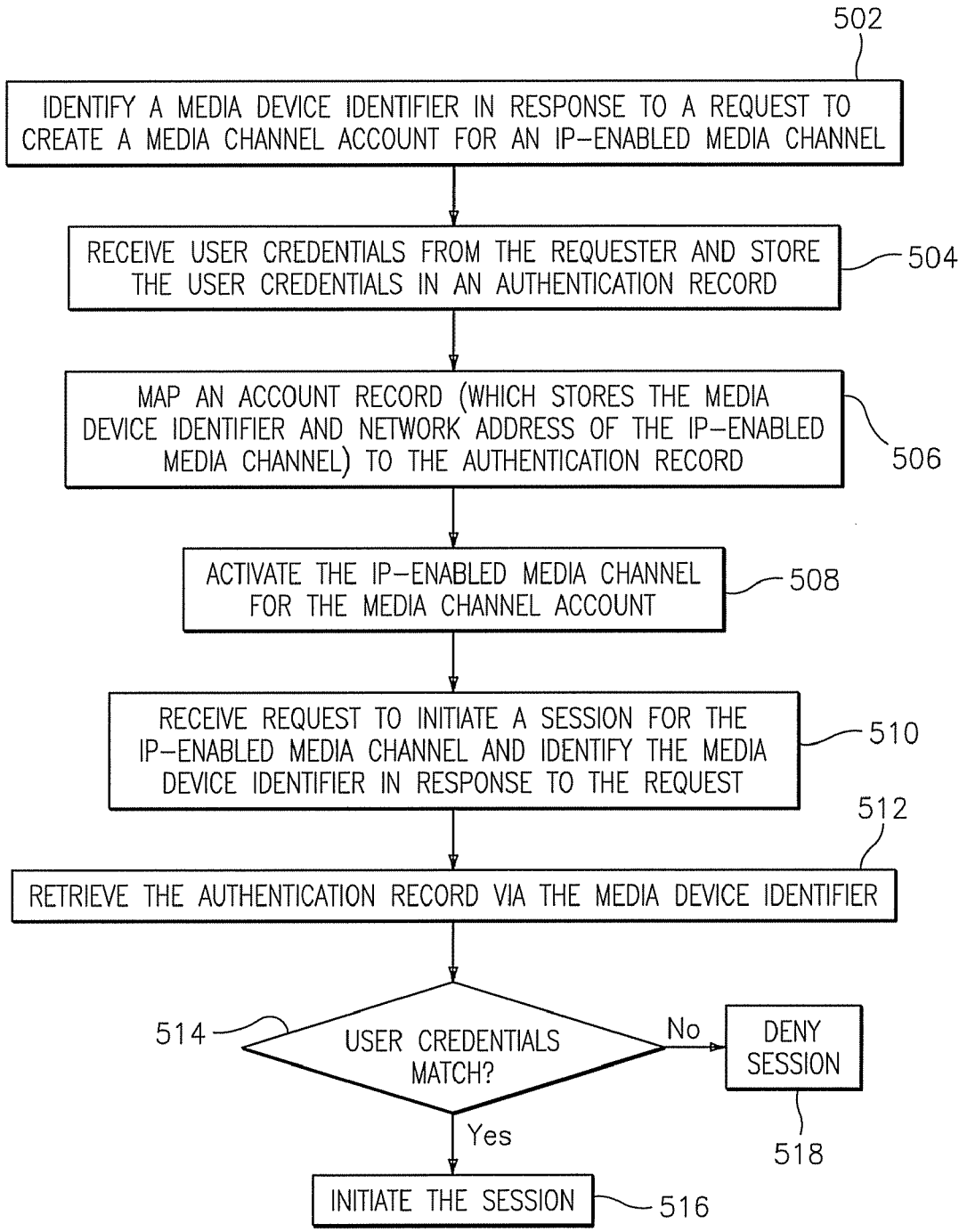
FIG. 15 is a flow diagram describing a process for managing access to a media channel in accordance with exemplary embodiments.

The network media services provide the capabilities to ensure the integrity and privacy of the content provided via the media channel web page. According to exemplary embodiments, the network media services application 114 includes an authentication component for ensuring that only an authorized broadcaster may update or modify the media channel web page. Turning now to FIGS. 1, 3, 14, and 15, the media channel access management features will now be described in accordance with exemplary embodiments. FIG. 14 is a sample authentication record 480 and FIG. 15 is a flow diagram describing a process for implementing the media channel management features described herein.

At step 502, the network media services application 114 identifies a media device identifier in response to a request to create a media channel account for an IP-enabled media channel. At step 504, the network media services application 114 receives user credentials from the requester and stores the user credentials in the authentication record 480 of FIG. 14. The user credentials are illustrated in record 480 as a USER_NAME 482 and a USER_PASSWORD and/or a PINCODE 484.

At step 506, the network media services application 114 maps an account record to the authentication record 480. The account record may be the account record 160 shown in FIG. 3. The account record 160 includes the media device identifier of a media device associated with the request and a network address for the media channel account. The authentication record 480 stores the user credentials of the requester. At step 508, the network media services application 114 activates the IP-enabled media channel for the media channel account. The IP-enabled media channel is now provisioned for use by the requester.

At step 510, the network media services application 114 identifies the media device identifier in response to the request to initiate a session, and retrieves the authentication record 480 via the media device identifier at step 512. At step 514, the network media services application 114 determines if the user credentials input by the requester match the user credentials stored in the authentication record 480. If so, the network media services application 114 initiates the session at step 516. The requester is an authorized broadcaster of media content on the IP-enabled media channel when a match occurs between the inputted user credentials and the user credentials stored in the authentication record 480. If, however, the user credentials do not match, the session is denied at step 518.

Once the session is initiated, the authorized broadcaster is provided with the ability to create and publish a media channel web page, as described in FIGS. 1-3.

Figure 16:
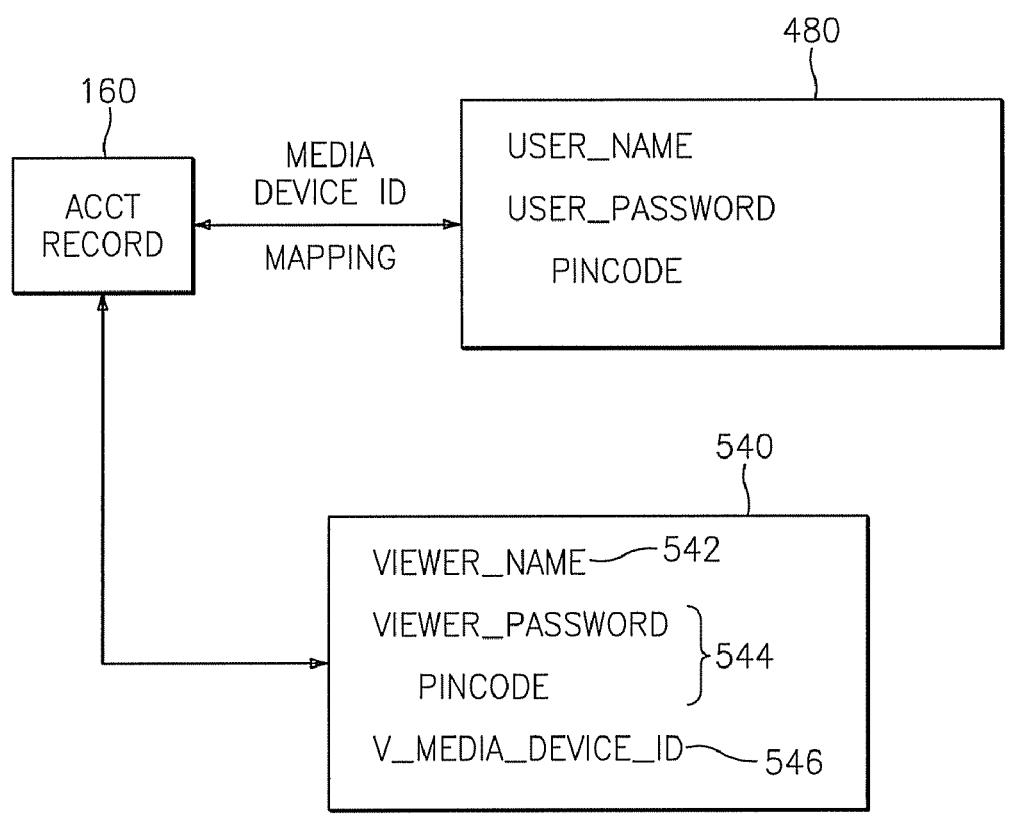
FIG. 16 is a viewer restriction record mapped to an account record for use in user managing viewer restrictions with respect to access to a media channel in accordance with exemplary embodiments.
Figure 17:
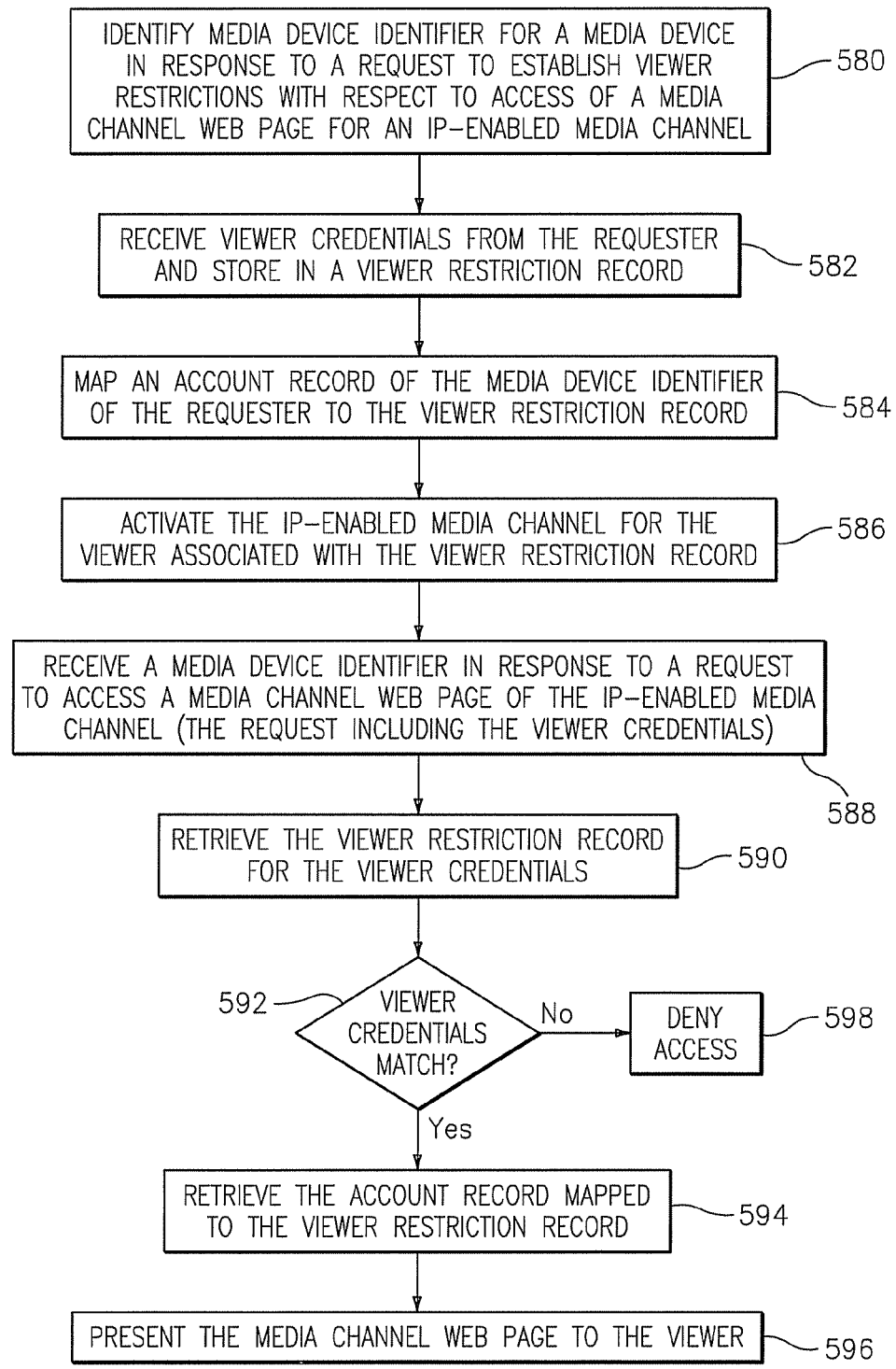
FIG. 17 is a flow diagram describing a process for managing viewer restrictions of access to a media channel in accordance with exemplary embodiments.
Figure 18:
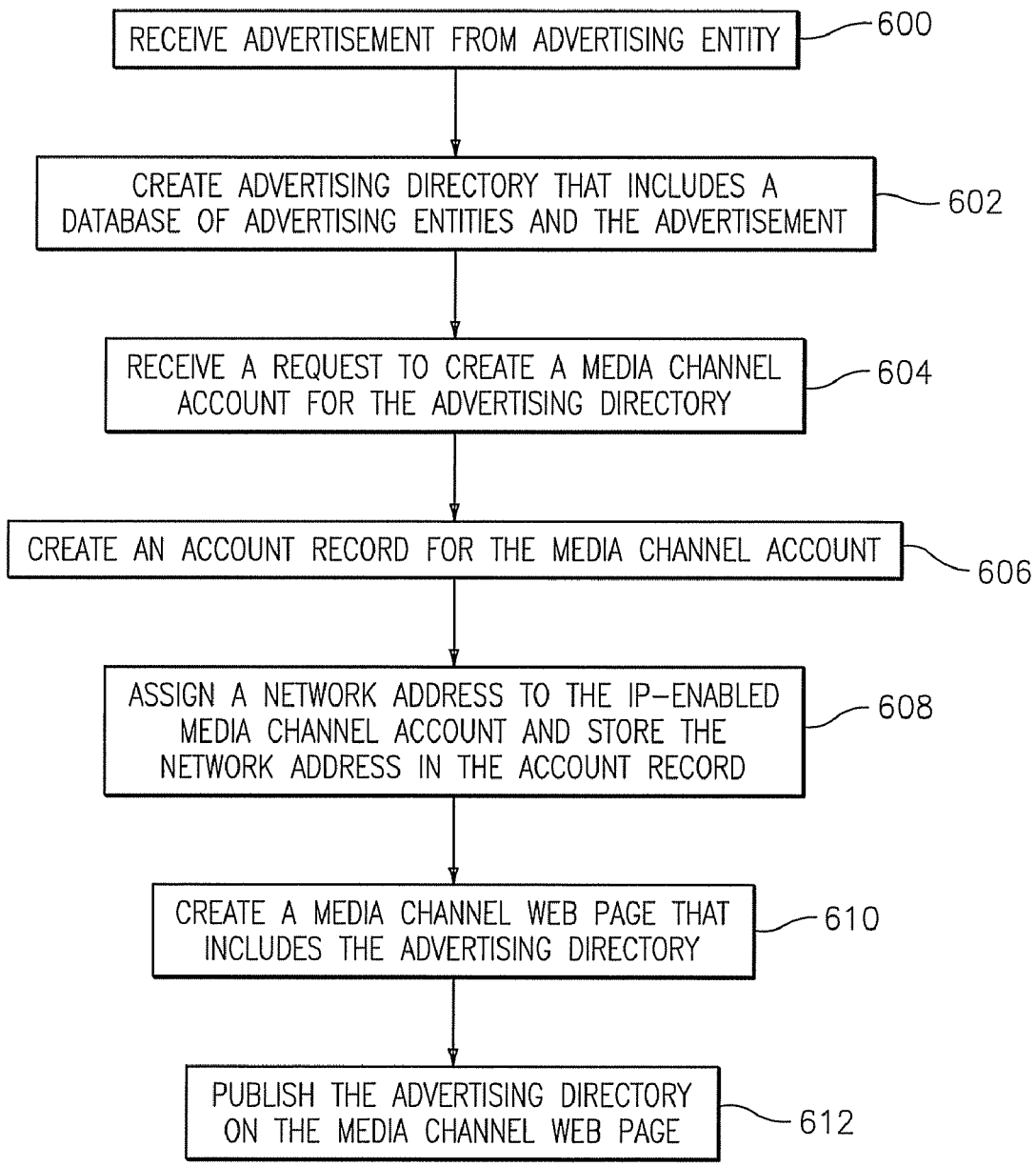
FIG. 18 is a flow diagram describing a process for implementing a media channel advertisement directory in accordance with exemplary embodiments.
Figure 19:
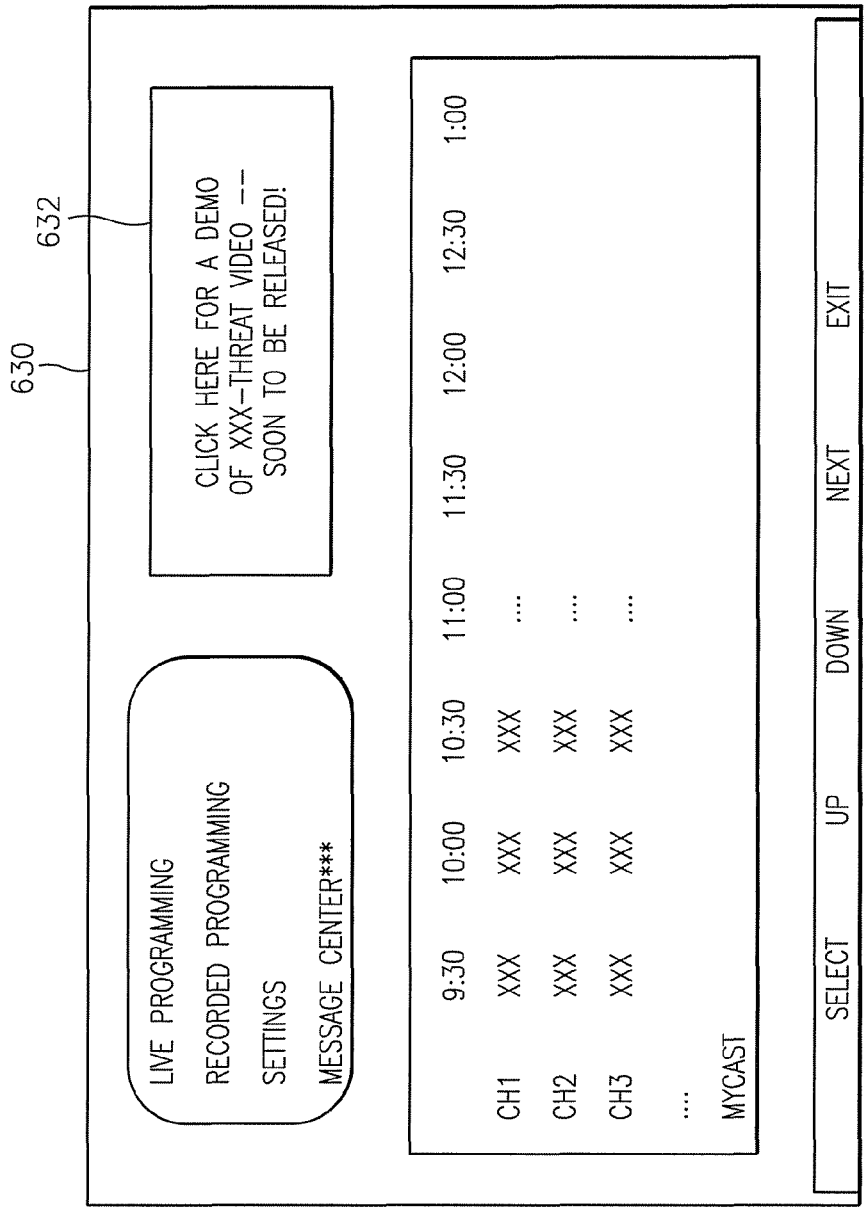
FIG. 19 is a user interface screen illustrating an advertisement presented on an electronic programming guide of a media device in accordance with exemplary embodiments.
Figure 20:
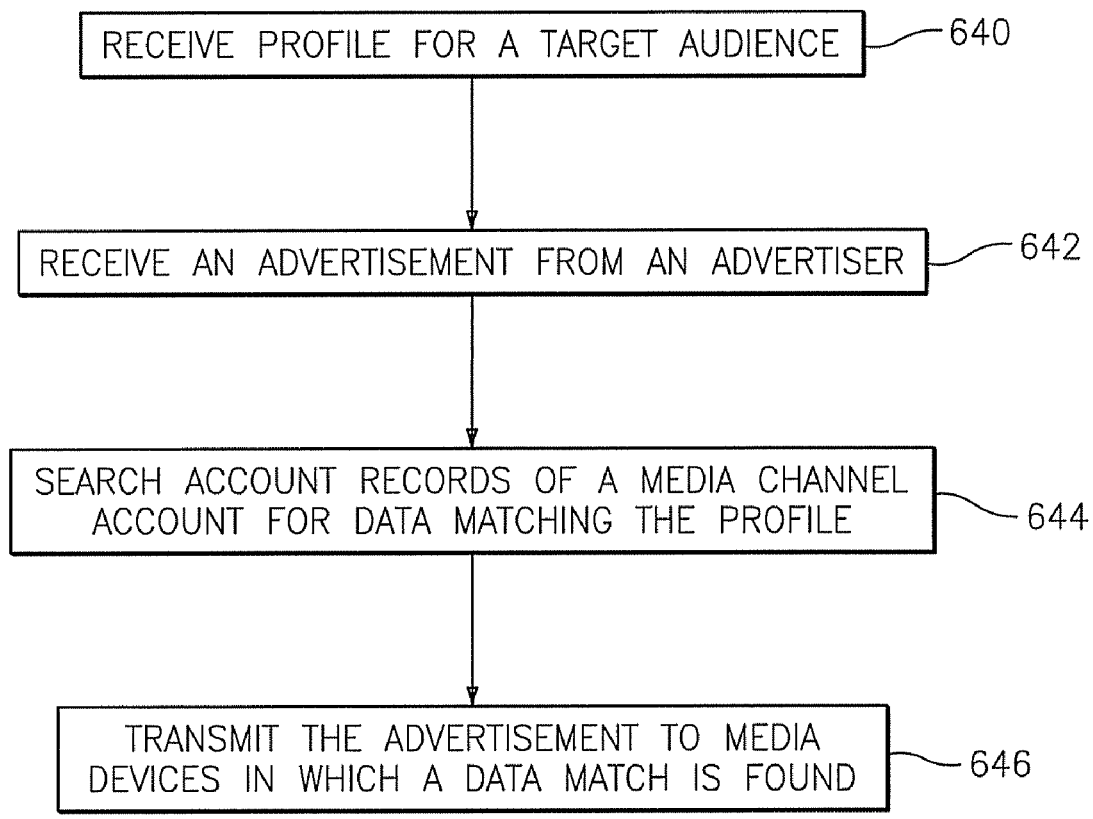
FIG. 20 is a flow diagram describing a process for implementing targeted advertising in accordance with exemplary embodiments.
Figure 21:
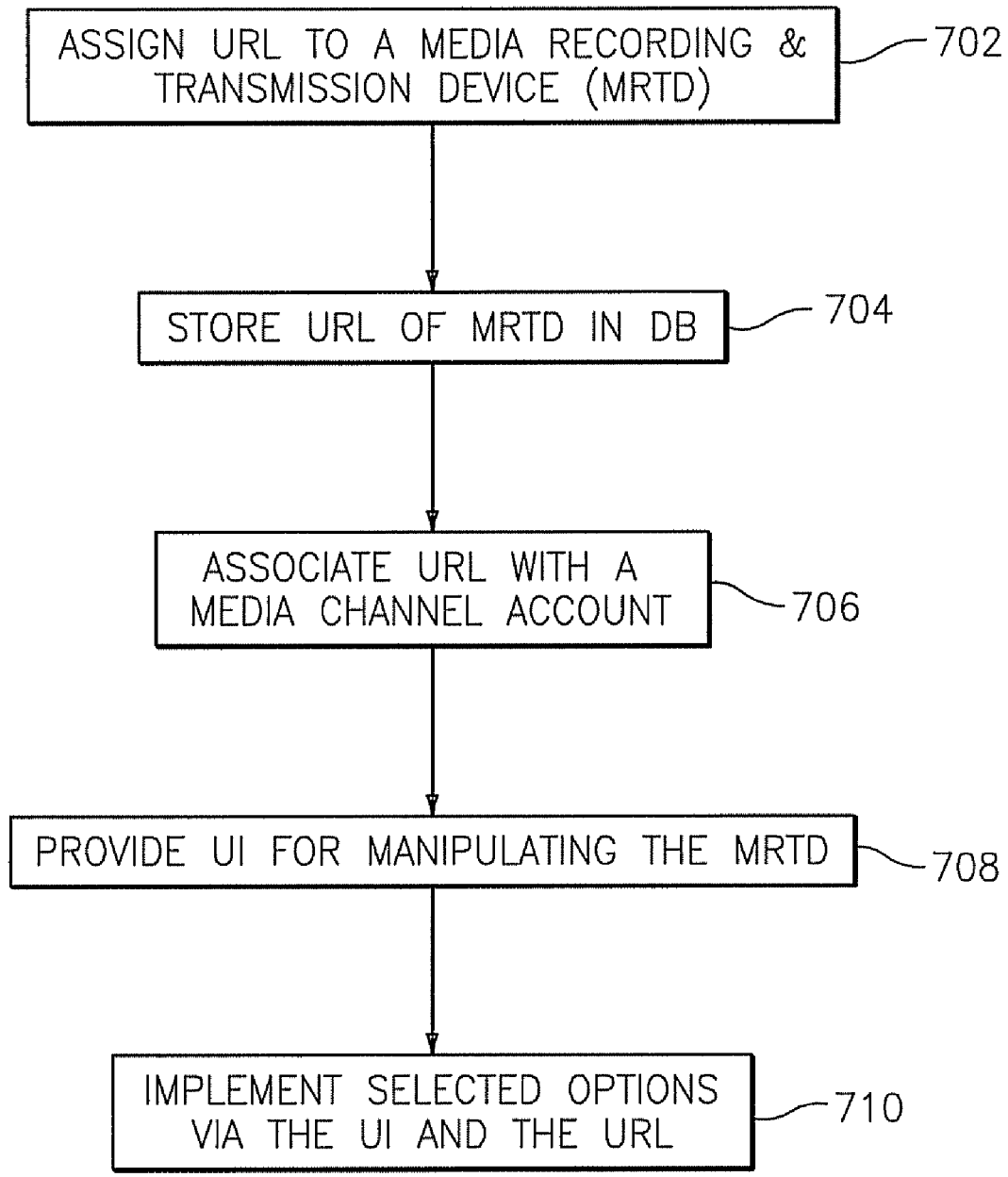
FIG. 21 is a flow diagram describing a process for implementing remote control management of a media channel recording device in accordance with exemplary embodiments.

The network media services provide the capabilities to ensure the integrity and privacy of the content provided via the media channel web page. The network media services application 114 includes a viewer restriction component 117 for ensuring that only an authorized viewing entity may access and view a media channel web page published by an authorized broadcaster. Turning now to FIGS. 1, 3, 16, and 17, the media channel access management features will now be described in accordance with exemplary embodiments. FIG. 16 is a sample viewer restriction record 540 and FIG. 17 is a flow diagram describing a process for implementing the media channel viewer restriction features described herein.

At step 580, the network media services application 114 identifies a media device identifier for a media device, such as the media device 104, in response to a request to establish viewer restrictions with respect to access of an IP-enabled media channel. At step 582, the network media services application 114 authenticates the requester (e.g., as described in FIGS. 14 and 15), and receives viewer credentials from the requester, which are stored in the viewer restriction record 540 of FIG. 16. The viewer credentials are illustrated in record 540 as a VIEWER_NAME 542 and a VIEWER_PASSWORD and/or a PINCODE 544.

At step 584, the network media services application 114 maps an account record associated with the media device identifier to the viewer restriction record 540. The account record may be the account record 160 shown in FIG. 3. The account record 160 includes the media device identifier of a media device associated with the request and a network address for the media channel. The viewer restriction record 540 stores the viewer credentials of the viewer entities in which the requester has granted access to the IP-enabled media channel. At step 586, the network media services application 114 activates the IP-enabled media channel access for the viewer restriction record 540.

At step 588, the network media services application 114 receives a media device identifier in response to a request to access a media channel web page of the IP-enabled media channel. The request includes the viewer credentials. At step 590, the network media services application 114 retrieves the viewer restriction record 540 for the viewer credentials. At step 592, it is determined whether the viewer credentials in the request match the viewer credentials stored in the viewer restriction record 540. If so, the network media services application 114 retrieves the account record mapped to the viewer restriction record at step 594, and presents the media channel web page to the viewer at step 596. If, however, no match is found, the network media services application 114 denies access to the media channel web page at step 598.

In an alternative exemplary embodiment, the media channel owner (e.g., the requester in step 580) may designate the viewer as a member of a community. The network media services application 114 receives a community designator for the viewer restrictions. The community designator identifies the viewer as a member of a private, semi-private, or public community. These communities may be the same as those described in FIGS. 1-3. As indicated above, the media device 104 may be an Internet Protocol enabled television (IPTV) device (e.g., 104B of FIG. 1) and the IP-enabled media channel is addressable via the IPTV device. In this embodiment, the media device identifier may be a GUID or MAC address of a set-top box communicatively coupled to the IPTV device.

The features provided by the network media management services include media channel-based management of an advertising directory.

Turning now to FIGS. 1, 3, 18, and 19, the media channel-based advertising directory will now be described in exemplary embodiments. The media channel-based advertising directory may be implemented via a dedicated media channel or may be incorporated into other media channels, e.g., on an electronic program guide associated with a media channel assigned to an individual.

At step 600, the network media services application 114 receives an advertisement from an advertising entity. According to exemplary embodiments, the advertising entity is included in a database of advertising entities. The database may include contact information for the advertising entities. At step 602, the network media services application 114 creates an advertising directory that includes the database of entities and the advertisement. At step 604, the network media services application 114 receives a request to create a media channel account for the advertising directory. In response to the request, the network media services application 114 creates an account record for the media channel account at step 606, assigns a network address to the IP-enabled media channel account, and stores the network address in the account record at step 608. At step 610, the network media services application 114 creates a media channel web page that includes the advertising directory, and publishes the advertising directory on a dedicated IP-enabled media at step 612.

The advertisement may include live streaming digital media and pre-recorded digital media. The live streaming digital media and pre-recorded digital media may be processed by the network media services application 114 in a manner similar to that described in FIGS. 1-10. In addition, the advertisement may include, e.g., audio files, static images, the live streaming digital media, the pre-recorded digital media, and text.

In one exemplary embodiment, the media device 104 is an Internet Protocol enabled television (IPTV) device (e.g., 104B of FIG. 1) and the IP-enabled media channel is addressable via the IPTV device. A sample user interface screen 630 depicting an advertisement presented to an EPG of a media device (e.g., media device 104B) is shown in a window 632 of FIG. 19.

As indicated above, the features provided by the network media services also include targeted advertising of content that is directed to one or more IP-enabled media channels. Using the media device identifier established, e.g., as a result of the account record 160 shown in FIG. 3, advertising entities can target specific media channels to which its advertisements may be directed.

Using information provided in the media channel accounts stored in storage device 116, as well as other sources of information, the targeted advertising features enable a service provider, such as host system 102 to more particularly define a target market to which advertisements may be transmitted. In one exemplary embodiment, the advertisements may be configured for media channels belonging to a particular category. As shown in the account record 160 of FIG. 3, for example, the COMMUNITY_SETTINGS data structure includes types of communities (e.g., private, semi-private, and public via the COMMUNITY_TYPE element), and the content descriptors 202 shown in FIG. 5, e.g., may be used to identify categories of communities. As indicated above, semi-private communities may include a religious organization, a school, a profit-based business enterprise, a non-profit based organization, a recreational organization, a neighborhood community, and a government agency, to name a few. Thus, this information may be useful in determining media channels on which to advertise. As an example, an advertiser who sells video games may select media channels associated with a category of community that relates to schools.

The targeted advertising may also utilize information, such as the media device identifiers of media channels, which provide geographic information concerning the location of a viewing community associated with the media channels. For example, using a GUID of a set top box (e.g., set top box 120 in FIG. 1), it may be determined that a media channel is directed to a school that is located in a geographic region. The association between the GUID and the geographic region may be implemented by identifying a DSLAM through which the media channel is transmitted.

Turning now to FIGS. 1, 3, 5, and 20, the targeted advertising services will now be described in accordance with exemplary embodiments. At step 640, the network media services application 114 receives a profile for a target audience from an advertiser. Profiles provide information that may be useful in determining a target market for advertising placement, e.g., role, gender, age group, personalized electronic programming guides, etc. provide significant information about a particular viewing media device. Other information may be derived from external sources, such as credit information (e.g., FICO scores), viewer address, account service package, residence, income range, etc.

Information from account records (e.g., account record 160) may be used to generate demographic profiles for account holders and users. A demographic profile, e.g., may specify a gender, income range, family structure (e.g., dual income, no children), credit worthiness, age range, residential area, etc. In addition, the profile information and a personalized electronic programming guide that provides information regarding viewing habits of a viewer of the viewing media device may enable the targeted advertising features to capture even greater details, such as the types of programming content the viewer has interest in (e.g., personal preferences or interests), as well as the viewing habits (e.g., particular time of day, number of hours, etc. a viewer is watching television).

At step 642, the network media services application 114 receives an advertisement from the advertiser. The network media services application 114 searches the account records for data matching at least a portion of the profile at step 644. The data may include a media device identifier that identifies a geographic location of a broadcaster of the media channel. The data may also include media device identifiers that identify a community of viewer media devices authorized to view the media channel web page.

At step 646, the network media services application 114 transmits an advertisement to media devices in which a data match for corresponding account records is found.

In alternative exemplary embodiments, the network media services application 114 may receive a pin code from a media channel web page via the advertisement. The pin code identifies a viewer media device and authorizes the transmission of future advertisements from the advertiser. A pin code is shown, e.g., in the authentication record 480 shown in FIG. 14, as well as the viewer restriction record 540 shown in FIG. 16. The network media services application 114 uses the pin code to select and transmit future advertisements to the viewer media device. The pin code may also be used to authorize the transmission of an advertisement to an alternative destination media device (e.g., media devices 104A and 104C shown in FIG. 1). The alternative destination media devices may include, e.g., a media channel web page of the viewer media device, an electronic programming guide on the viewer media device, an email account, a voicemail account, and an instant messaging account.

As indicated above, the network media services include remote control management of a media recording and transmission device (e.g., media device 104D). The management of the media recording and transmission device may be implemented by a user interface of the network media services application 114. As shown in FIG. 5, the preview option 206 enables a user to preview live media content prior to initiating live broadcast of the media content via the media channel web page. Upon selecting the preview option 206, the user is presented with additional options for modifying a viewing angle of the media recording and transmission device 104D. A flow diagram describing a process for implementing the remote control management of the media recording and transmission device 104D is provided in FIG. 21 and a sample computer screen window 730 for modifying the viewing angle is shown in FIG. 22.

Figure 22:
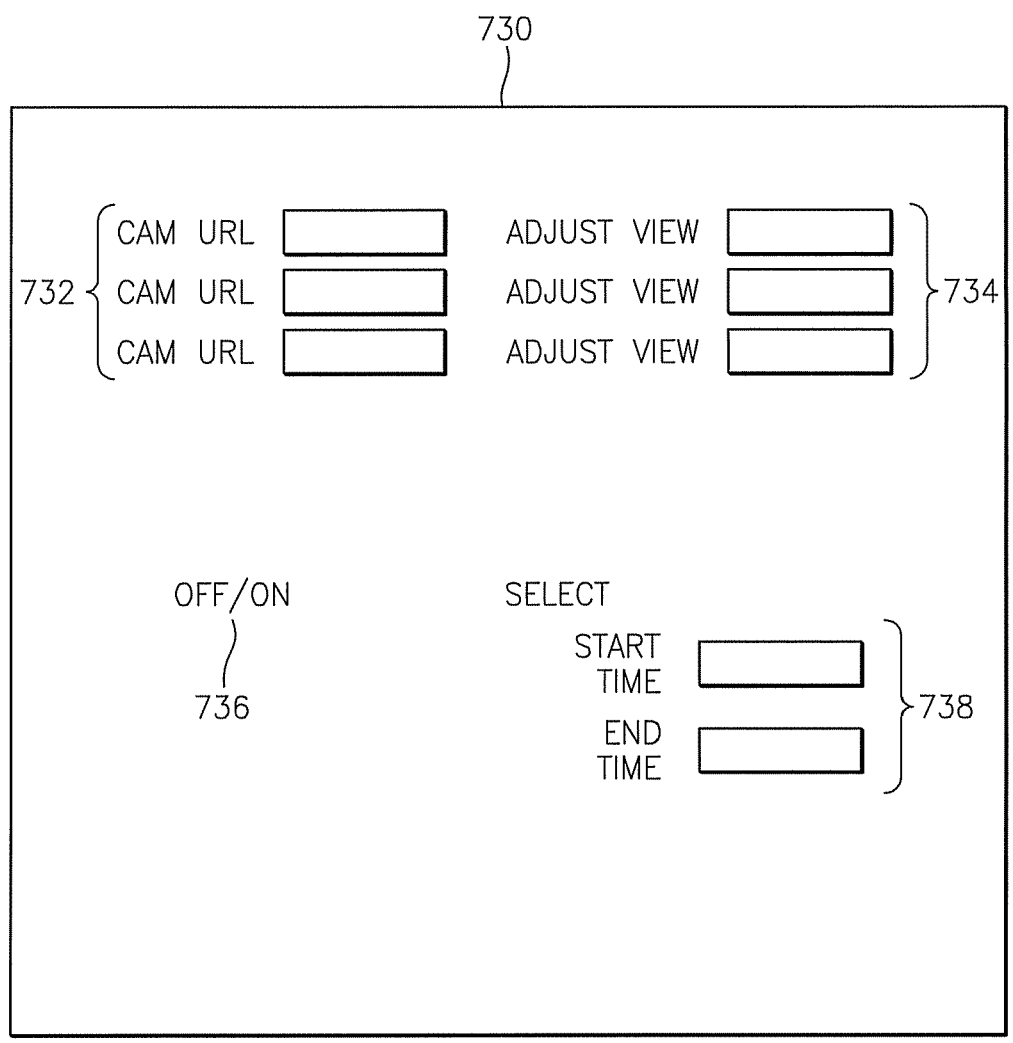
FIG. 22 is a user interface screen for implementing remote control management of a media channel recording device in accordance with exemplary embodiments.

Turning now to FIGS. 1, 5, 21, and 22, the remote control management of a media recording and transmission device will now be described in exemplary embodiments. Upon selecting the preview option 206 of FIG. 5, a user interface screen 730 is presented to the user. The user interface screen 730 is illustrated in FIG. 22. The user enters a uniform resource locator (URL) of a desired media recording and transmission device 104D via a field 732, which is assigned to the media recording and transmission device 104D at step 702. At step 704, the URL, along with a descriptor (optional-for example, camera 1 or lake house cam, etc.) are stored in a database. At step 706, the URL is associated with the media channel account of the user. The user may implement several actions using options provided via the user interface screen 730 at step 708. Options include, e.g., adjusting a recording angle of the media recording and transmission device 104D via ADJUST VIEW field 734. Additionally, the user interface screen 730 provides the user with options to activate/deactivate recording by the media recording and transmission device 104D via field 736, as well as selecting start/stop times of recording via field 738.

Once the options have been selected by the user, these options are implemented with respect to the selected media recording and transmission device 104D via the user interface screen 730 and the corresponding URL at step 710.

As indicated above, a user may establish an interactive electronic programming guide (EPG) via the network media services. The interactive EPG enables a user to receive and select media channels (e.g., media channels in which the user is a member of a defined community, such as private or semi-private, as well as media channels that have no restrictions public media channels) to include on the EPG. Additionally, if the user is an authorized broadcaster of a media channel (as described above), the user may add the media channel to the EPG program listing. As shown in FIG. 13, a media channel option "MYCAST" enables the user to select, view, add, or modify authorized media channels the EPG. The user may also communicate information concerning the media channels to other members of a community shared by the user via the EPG and media channel option.

Figure 23:
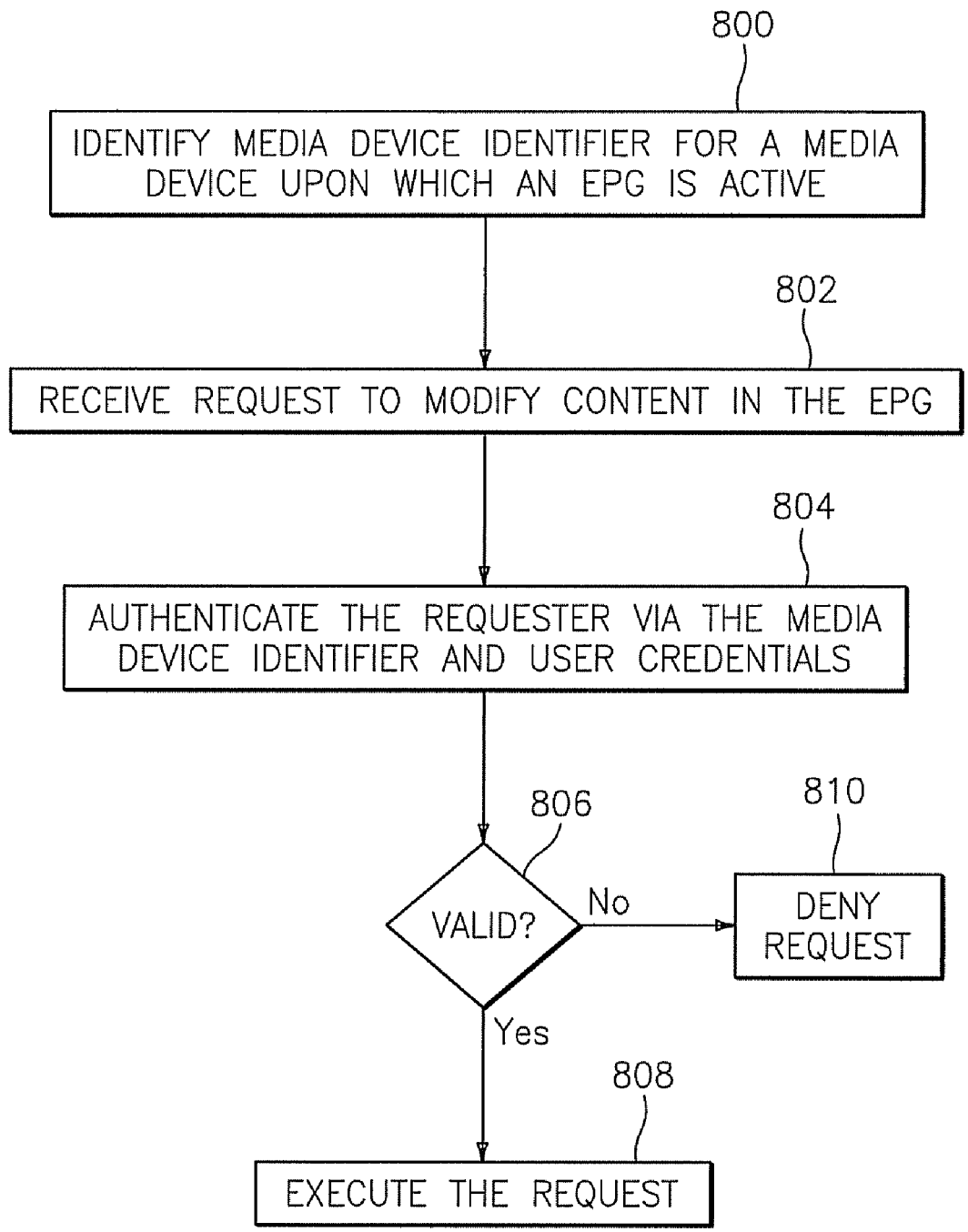
FIG. 23 is a flow diagram describing a process for implementing an interactive electronic programming guide (EPG) manager in accordance with exemplary embodiments.

Turning now to FIGS. 1 and 23, the interactive EPG manager will now be described in exemplary embodiments. FIG. 23 is a flow diagram describing a process for implementing the EPG manager.

At step 800, the network media services application 114 identifies a media device identifier for a media device, such as the media device 104, upon which an EPG is active. This may be accomplished in a similar manner as that described above in FIGS. 1-10. At step 802, the network media services application 114 receives a request to modify content in the EPG. The request may be received via an input device associate with the media device through which the request is made.

At step 804, the network media services application 114 authenticates the requester via the media device identifier. This step may be implemented using the authentication processes described above. At step 806, it is determined whether the requester is authorized to initiate the modification. If so, the network media services application 114 executes the modification at step 808. Otherwise, the request is denied at step 810. The modification may include one or more of: adding a media channel to the EPG channel listing; removing a media channel from the EPG channel listing; authorizing an advertiser to transmit an advertisement to the EPG; and generating a notification relating to a new or modified media channel web page to which the requester is an authorized broadcaster. These features are similar to those described above and, to this extent, will not be repeated.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing Internet Protocol-enabled media channel services, comprising:

provisioning an Internet-Protocol-enabled media channel in response to a request to create a media channel account, comprising:

creating an account record for the media channel account, assigning a media device identifier to the account record, and assigning a network address to the media channel account, and storing the network address in the account record;

populating a storage system with editable content and non-editable content, the editable content received and controlled by a user of the media channel account via a media device, and the non-editable content controlled by a network media services application in communication with the storage system, the non-editable content including content status data that distinguishes live streaming digital media versus pre-recorded digital media, and on-air versus off-air status of the live streaming digital media; and creating and presenting a media channel web page that includes the editable and non-editable content from the storage system in response to a request by the user to initiate a session for the Internet Protocol-enabled media channel.

2. The method of claim 1, wherein provisioning the Internet Protocol-enabled media channel further comprises:

assigning a network address to a media recording and transmission device; and storing the network address of the media recording and transmission device in the account record;

wherein the editable content includes content selections received with respect to multiple media recording and transmission devices associated with the account record, the content selections editable by activating and deactivating a network address for a corresponding one of the media recording and transmission devices.

3. The method of claim 2, wherein the network media services application executes on a web application server in communication with the storage system, the network media services application including a graphical user interface for receiving a portion of the editable content and for executing user-configured settings with respect to the media channel web page.

4. The method of claim 3, further comprising:
receiving, at the web application server, the media device identifier from the media device in response to the request to initiate a session, the media device identifier transmitted to the web application server via a terminal server in communication with the media device and the web application server.

5. The method of claim 3, wherein:
the editable content includes formatting, layout, and design options for elements of the media channel web page, and user-selected members of a community authorized to view the media channel web page; and
the non-editable content associated with the network media services application further includes content status data that distinguishes:
subject categories describing content and communities with which the media channel web page is shared.

6. The method of claim 3, further comprising:
receiving at least one of the live streaming digital media and the pre-recorded digital media at a media server in communication with the web application server, the live streaming digital media and the pre-recorded digital media transmitted to the media device via the media channel web page.

7. The method of claim 6, wherein a portion of the editable content is associated with the media server, the portion of the editable content including content selections with respect to
audio files,
static images,
the live streaming digital media,
the pre-recorded digital media, and
text.

8. The method of claim 5, wherein the communities are configured
a private community,
a semi-private community, and
a public community.

9. The method of claim 8, wherein the private community comprises a group of media devices that are associated with a family member; and
wherein provisioning the Internet Protocol-enabled media channel further comprises:
storing a network address of each of the small group of media devices in the account record, and
associating a descriptor with each of the media devices in the group.

10. The method of claim 8 wherein the semi-private community comprises a group of media devices that are associated with a defined community, the defined community comprising one of a profit and a non-profit organization.

11. The method of claim 8, wherein the public community comprises a group of media devices for which no viewing restrictions are imposed.

12. A system for providing Internet Protocol-enabled media channel services, comprising:
a computer processing device; and
an application executable by the computer processing device, the application configured to implement a method, the method comprising:
provisioning an Internet-Protocol-enabled media channel in response to a request to create a media channel account, comprising:
creating an account record for the media channel account,
assigning a media device identifier to the account record, and
assigning a network address to the media channel account, and storing the network address in the account record;
populating a storage system with editable content and non-editable content, the editable content received and controlled by a user of the media channel account via a media device, and the non-editable content controlled by a network media services application in communication with the storage system, the non-editable content including content status data that distinguishes live streaming digital media versus pre-recorded digital media, and on-air versus off-air status of the live streaming digital media; and
creating and presenting a media channel web page that includes the editable and non-editable content from the storage system in response to a request by the user to initiate a session for the Internet Protocol-enabled media channel.

13. The system of claim 12, wherein provisioning the Internet Protocol-enabled media channel further comprises:
assigning a network address to a media recording and transmission device; and
storing the network address of the media recording and transmission device in the account record;
wherein the editable content includes content selections received with respect to multiple media recording and transmission devices associated with the account record, the content selections editable by activating and deactivating a network address for a corresponding one of the media recording and transmission devices.

14. The system of claim 13, wherein the network media services application executes on a web application server in communication with the storage system, the network media services application including a graphical user interface for receiving a portion of the editable content and for executing user-configured settings with respect to the media channel web page.

15. The system of claim 14, wherein the method further comprises:
receiving, at the web application server, the media device identifier from the media device in response to the request to initiate a session, the media device identifier transmitted to the web application server via a terminal server in communication with the media device and the web application server.

16. The system of claim 14, wherein:
the editable content includes formatting, layout, and design options for elements of the media channel web page, and user-selected members of a community authorized to view the media channel web page; and
the non-editable content associated with the network media services application further includes content status data that distinguishes subject categories describing content and communities with which the media channel web page is shared.

17. The system of claim 16, wherein the communities are configured as a private community, a semi-private community, and a public community.

18. The system of claim 17, wherein the private community comprises a group of media devices that are associated with a family member; and
wherein provisioning the Internet Protocol-enabled media channel further comprises:
storing a network address of each of the small group of media devices in the account record, and associating a descriptor with each of the media devices in the group.

19. The system of claim 14, wherein the method further comprises:

receiving at least one of the live streaming digital media and the pre-recorded digital media at a media server in communication with the web application server, the live streaming digital media and the pre-recorded digital media transmitted to the media device via the media channel web page.

20. The system of claim 19, wherein a portion of the editable content is associated with the media server, the portion of the editable content including content selections with respect to audio files, static images, the live streaming digital media, the pre-recorded digital media, and text.

* * * * *